(12) United States Patent
Tsuchida et al.

(10) Patent No.: US 11,290,456 B2
(45) Date of Patent: Mar. 29, 2022

(54) SECRET EQUALITY DETERMINATION SYSTEM, SECRET EQUALITY DETERMINATION METHOD AND SECRET EQUALITY DETERMINATION PROGRAM RECORDING MEDIUM

(71) Applicant: NEC CORPORATION, Tokyo (JP)

(72) Inventors: Hikaru Tsuchida, Tokyo (JP); Toshinori Araki, Tokyo (JP); Kazuma Ohara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 120 days.

(21) Appl. No.: 16/769,792

(22) PCT Filed: Dec. 5, 2017

(86) PCT No.: PCT/JP2017/043631
§ 371 (c)(1),
(2) Date: Jun. 4, 2020

(87) PCT Pub. No.: WO2019/111319
PCT Pub. Date: Jun. 13, 2019

(65) Prior Publication Data
US 2021/0176252 A1 Jun. 10, 2021

(51) Int. Cl.
*H04L 29/06* (2006.01)
*G06F 7/58* (2006.01)

(52) U.S. Cl.
CPC .............. *H04L 63/10* (2013.01); *G06F 7/588* (2013.01)

(58) Field of Classification Search
CPC ....... H04L 63/10; H04L 9/085; H04L 9/0869; H04L 9/0894; H04L 63/04;
(Continued)

(56) References Cited

U.S. PATENT DOCUMENTS

2015/0180902 A1  6/2015  Biswas et al.
2016/0335440 A1*  11/2016  Clark ..................... H04L 9/085
(Continued)

OTHER PUBLICATIONS

Adi Shamir, "Howto Share a Secret", Communications of ACM, Nov. 1979, pp. 612-613, vol. 22, No. 11.
(Continued)

*Primary Examiner* — Jacob Lipman
(74) *Attorney, Agent, or Firm* — Sughrue Mion, PLLC

(57) ABSTRACT

A random number generation server device includes a random number generation unit generating random numbers, a share addition unit generating secret shared data masked using random numbers and the secret shared data of operands in secret equality determination, a secret shared data generation unit generating secret shared data of inputted values, a secret shared data restoration unit obtaining the original values by restoring the secret shared data, and a determination bit-conjunction unit using the secret shared data to perform secret equality determination. A mask value restoration server device includes a secret shared data generation unit, a secret shared data restoration unit, and a determination bit-conjunction unit. A secure computation server device includes a secret shared data generation unit, a secret shared data restoration unit, and a determination bit-conjunction unit.

8 Claims, 16 Drawing Sheets

(58) Field of Classification Search
CPC ... H04L 2209/46; G06F 7/588; G06F 21/606; G06F 21/6218; G09C 1/00
USPC .......................................................... 726/4
See application file for complete search history.

(56) References Cited

U.S. PATENT DOCUMENTS

2019/0205568 A1* 7/2019 Veugen .................. G06F 7/723
2021/0273798 A1* 9/2021 Li .......................... G06F 21/71

OTHER PUBLICATIONS

Dan Bogdanov et al, "High-performance secure multi-party computation for data mining applications", International Journal of Information Security, Published online Sep. 9, 2012, pp. 403-418, 11(6).

Takashi Nishide et al., "Multiparty Computation for Interval, Equality, and Comparison without Bit-Decomposition Protocol", Public Key Cryptography—PKC 2007, LNCS, [online], 2007, pp. 343-360, vol. 4450,[retrieved on Mar. 5, 2018], retrieved from the Internet <URL: http://doi.org/10.1007/978-3-540-71677-8_23>.

Andrew C. Yao, "Protocols for Secure Computations," In Proceedings of the 21st Annual IEEE Symposium on the Foundations of Computer Science, 1982, pp. 160-164.

Toshinori Araki et al., "High-Throughput Semi-Honest Secure Three-Party Computation with an Honest Majority", In proceedings of the 2016 ACM SIGSAC Conference on Computer and Communications Security, pp. 805-817, ACM.

Ivan Damgard et al., "Unconditionally Secure Constant-Rounds Multi-party Computation for Equality, Comparison, Bits and Exponentiation", Theory of Cryptography, [online] 2006, (TCC 2006), LNCS vol. 3878, pp. 285-304, [retrieved on Mar. 5, 2018], retrieved from the Internet <URL: http://doi.org/10.1007/11681878_15>.

Written Opinion for PCT/JP2017/043631, dated Mar. 13, 2018.
International Search Report for PCT/JP2017/043631, dated Mar. 13, 2018.

* cited by examiner

SECRET EQUALITY DETERMINATION SYSTEM, SECRET EQUALITY DETERMINATION METHOD AND SECRET EQUALITY DETERMINATION PROGRAM RECORDING MEDIUM

CROSS REFERENCE TO RELATED APPLICATIONS

This application is a National Stage of International Application No. PCT/JP2017/043631 filed Dec. 5, 2017.

TECHNICAL FIELD

This invention relates to a secure computation protocol and, more particularly, to a secret equality determination system, a secret equality determination method, and a secret equality determination program recording medium, which are capable of efficiently performing a secret equality determination.

BACKGROUND ART

A secure computation protocol is a technique which can obtain a computed result alone while an input of each participant of the protocol and values in computation processes are concealed. As the secure computation protocol, general methods, which can execute any computation with logic circuits and arithmetic circuits used as bases, are proposed.

In a case of executing any computation by the secure computation protocol, a communication cost is incurred. The communication cost is evaluated by two evaluation axes of the number of communication rounds and communication traffic. Herein, the number of communication rounds is the number of times of communications which occur among the respective participants of the secure computation protocol when certain computation processing is executed by the secure computation protocol. In this event, it is assumed, for example, that three participants of the secure computation protocol are represented by P1, P2, and P3. It is assumed that, on executing certain computation processing by the secure computation protocol, one communication occurs between P1 and P2, one communication occurs between P2 and P3, and one communication occurs between P3 and P1. In this event, it is noted that the number of communication rounds is counted as one round if these communications can be concurrently carried out. In addition, the communication traffic is an amount of communication data which are generated among the respective participants of the secure computation protocol when certain computation processing is executed by the secure computation protocol.

Various secure search techniques which allow searched data to be secured while being kept secret have been proposed from the past.

As one technique for achieving secure search, a Multi-Party Computation (MPC) technique is known (e.g. see Non Patent Literature 1).

In the MPC, two or more server devices, each holding a piece of secret information, cooperatively execute computations so as to compute values of any function supplied with the secret information without revealing their respective pieces of secret information. The secure search by means of the MPC may be realized as follows. First, data to be deposited are shared and held in the above-mentioned two or more server devices by means of a secret sharing method (e.g. see Non Patent Literature 1). Then, the above-mentioned function is defined as "a function of returning 1 when data including certain partial data are secretly shared and held in the server devices and of returning 0 otherwise".

As a means of realizing the MPC, there is a means of using a threshold-type secret sharing method of Shamir (Shamir's Secret Sharing: SSS), which is described in Non Patent Literature 1. First, Non Patent Literature 1 will be described.

The threshold-type secret sharing method is a technique of converting the secret information into a plurality of pieces of shared information. The threshold-type secret sharing method has a characteristic that the secret information can be restored by gathering the pieces of converted shared information that are not less in number than a threshold value and the original secret information is not revealed from the pieces of the shared information that are less in number than the threshold value.

The SSS in Non Patent Literature 1 is a method of secretly sharing a number a belonging to a finite field Zp by N server devices, and uses a (k−1)th-order polynomial $f\_a(x)$. In this method, for example, let $f\_a(0)=a$, and each point $f\_a(i)$ on the polynomial is distributed to an i-th server device ($1 \le i \le N$). The distributed information $f\_a(i)$ is called shared information of x in the SSS. In this event, it is possible to uniquely restore the (k−1)th-order polynomial $f\_a(x)$ from k points on the polynomial if k server devices cooperate with one another, and then it is possible to calculate $f\_a(0)$ being the secret information.

Pieces of shared information of the secret information a, that are generated on sharing the secret information a by the N server devices using the polynomial $f\_a(x)$ modulo p, are written as $[a]p=(f\_a(1), f\_a(2), \ldots, f\_a(N))$. In this event, it is assumed that $f\_a(i)$ is held in the i-th server device having an identifier i ($1 \le i \le N$).

As general methods which can execute any calculation, for example, Non Patent Literature 2, Non Patent Literature 3, Non Patent Literature 4, and Non Patent Literature 5 are cited. Types of methods are roughly classified into a method based on a Garbled Circuit represented by Non Patent Literature 4 and a method based on a secret sharing method such as Non Patent Literature 2, Non Patent Literature 3, and Non Patent Literature 5. It is noted that the secret sharing method is a technique capable of restoring original secret information by distributing a value into a plurality of shared values and gathering the shared values that are not less in number than a threshold value. Herein, the shared values are called secret shared data or shares.

Non Patent Literature 3 discloses a secure computation protocol which can execute computation for a logical circuit, an arithmetic circuit, and a circuit obtained by mixing the both circuits. Different from Non Patent Literature 2, Non Patent Literature 3 uses the secret sharing method of Non Patent Literature 1 and performs computation on a field with a prime number p as an order. Therefore, in Non Patent Literature 3, communication traffic is increased in proportion to a magnitude of the order of the field. Herein, it is noted that, on computing a mixed circuit of the logical circuit and the arithmetic circuit, both of a value in the logical circuit and a value in the arithmetic circuit are values belonging to the field with the prime number p as the order. In addition, in Non Patent Literature 3, it is possible to execute the computation with a constant number of communication rounds regardless of the magnitude of the order. However, a large amount of the communication traffic is required.

Non Patent Literature 4 discloses a secure computation protocol which executes computation based on a logical circuit. A method of Non Patent Literature 4 is a method using a pseudo-random function and an oblivious transfer protocol and can execute computation with a constant number of communication rounds. However, the method of Non Patent Literature 4 requires a large amount of the communication traffic.

Non Patent Literature 2 discloses a secure computation protocol which can execute computation for a logical circuit, an arithmetic circuit, and a circuit obtained by mixing the both circuits. A method of Non Patent Literature 2 is a method based on an additive secret sharing method on a residue ring, in which communication traffic is increased in proportion to a magnitude of the order of the ring. Different from the method of Non Patent Literature 3, the method of Non Patent Literature 2 can perform, on computing the mixed circuit of the logical circuit and the arithmetic circuit, computation on the rings corresponding to their respective values. For example, computation is possible with a value of the logical circuit assumed to be a value belonging to the ring of the order of 2 and a value of the arithmetic circuit assumed to be a value belonging to the ring of the order of $2^{n'}$ (n' is an integer greater than 2). In the method of Non Patent Literature 3, it is necessary to compute values of 0, 1 in the logical circuit also on the field with the prime number p as the order. Therefore, in Non Patent Literature 2, the communication traffic can be kept lower. As compared with the methods of executing computation with a constant number of communication rounds, such as those in Non Patent Literature 3 and Non Patent Literature 4, the same computation processing can be executed with less communication traffic in Non Patent Literature 2. However, in the method of Non Patent Literature 2, the number of communication rounds is increased in proportion to a circuit depth for computation processing.

Herein, the circuit depth for computation processing does not mean the maximum total number of gates required to pass through from an input gate to an output gate but means the maximum total number of AND gates and multiplication gates that are required to pass through from the input gate to the output gate. Hereinafter, the circuit depth means the maximum total number of the AND gates, the multiplication gates, and secret sharing restoration gates that are required to pass through from the input gate to the output gate.

Non Patent Literature 5 discloses a secure computation protocol which can execute computation for a logical circuit, an arithmetic circuit, and a circuit obtained by mixing the both circuits. A method of Non Patent Literature 5 is a method based on a replicated secret sharing method on a residue ring and has communication traffic which is increased in proportion to a magnitude of the order. Herein, like the method of Non Patent Literature 2, the method of Non Patent Literature 5 is different from the method of Non Patent Literature 3 and can perform, on computing the mixed circuit of the logical circuit and the arithmetic circuit, computation on the rings corresponding to their respective values. Therefore, as compared with the method of Non Patent Literature 3, the communication traffic can be kept lower in Non Patent Literature 5. In addition, as compared with methods of executing computation with a constant number of communication rounds, such as those in Non Patent Literature 3 and Non Patent Literature 4, the same computation processing can be executed with less communication traffic in Non Patent Literature 5. However, in the method of Non Patent Literature 5, the number of communication rounds is increased in proportion to a circuit depth for computation processing.

Herein, for example, a secure computation protocol excellent in efficiency in an aspect of the number of communication rounds is an effective method in a communication environment where latency is large. On the other hand, a secure computation protocol excellent in efficiency in an aspect of the communication traffic is an effective method in a communication environment where a communication band is narrow. In the secure computation protocol based on secret sharing, communications occur in proportion to a circuit depth and, therefore, an attempt may be made to achieve an improvement in processing amount per unit time by processing a large amount of inputs simultaneously. Thus, especially, in a case where the processing amount per unit time is desired to be secured even in the communication environment where the communication band is narrow, it is important to propose the secure computation protocol excellent in efficiency with respect to the communication traffic.

In this event, it is necessary to propose a method efficient in efficiency not only with respect to basic binary operations, such as an exclusive OR, an AND, addition, and multiplication, but also with respect to an upper computation protocol. As the upper computation protocol, for example, secret equality determination is exemplified. Herein, the secret equality determination is processing which comprises taking, as arguments, elements a and b on a secure ring; returning a value obtained by securing 1, which is an element on the ring of the order 2, if a and b agree with each other; and returning a value obtained by securing 0, which is an element on the ring of the order 2, in case of disagreement. The secret equality determination is frequently used in character string processing such as partial agreement determination and distance calculation in the secure computation protocol.

Herein, the number of communication rounds by the secret equality determination of Non Patent Literature 2 is equal to $(\text{Log}(L)+1)$ and the communication traffic thereof is equal to $(17L-15)$ bits. Herein, a base of Log is 2 and L is a bit length of the order of the ring. In Non Patent Literature 2, in order to suppress the number of communication rounds in the secret equality determination, a technique depending on the additive secret sharing method used in Non Patent Literature 2 is used. Specifically, on secretly sharing a value v, the number of communication rounds is decreased by using y as secret shared data for a participant and 0 as secret shared data for remaining participants. It is therefore impossible to carry out the secret equality determination of Non Patent Literature 2 by Non Patent Literature 5.

CITATION LIST

Non Patent Literature(s)

NPL 1: Adi Shamir, "How to Share a Secret," Commun. ACM 22(11), pp. 612-613, 1979.

NPL 2: Dan Bogdanov, Margus Niitsoo, Tomas Toft, Jan Willemson, "High-performance secure multi-party computation for data mining applications," International Journal of Information Security, 11(6), 403-418.

NPL 3: Takashi Nishide, Kazuo Ohta, "Multiparty Computation for Interval, Equality, and Comparison without Bit-Decomposition Protocol," In PKC2007, LNCS, vol. 4450, [online], 2007, pp. 343-360, [retrieved on 5 Mar. 2018], retrieved from the Internet <URL: http://doi.org/10.1007/978-3-540-71677-8_23>

NPL 4: Andrew C, Yao, "Protocols for secure computations," In Proceedings of the 21st Annual IEEE Symposium on the Foundations of Computer Science, pp. 160-164, 1982.

NPL 5: Toshinori Araki, Jun Furukawa, Yehuda Lindell, Ariel Nof, Kazuma Ohara, "High-Throughput Semi-Honest Secure Three-party Computation with an Honest Majority", In Proceedings of the 2016 ACM SIGSAC Conference on Computer and Communications Security, pp. 805-817, ACM.

SUMMARY OF INVENTION

Technical Problem

As described above, in Non Patent Literature 2, the technique depending on the additive secret sharing method used in Non Patent Literature 2 is used on carrying out the secret equality determination. Therefore, it is impossible to perform the similar secret equality determination by using Non Patent Literature 5 which can execute AND or multiplication with less communication traffic than that of Non Patent Literature 2. In a case where the communication traffic is large on performing the secret equality determination, degradation of the processing amount per unit time may occur in the communication environment where the communication band is narrow. In particular, in a case of executing, by the secure computation protocol, the character string processing frequently using the equality determination, an increase of the communication traffic in the secret equality determination may cause deterioration of the processing amount per unit time in computation processing as a whole.

It is an object of the present invention to provide a secret equality determination system, a secret equality determination method, and a secret equality determination program recording medium, which can solve the above-mentioned problems and which can execute secret equality determination with the number of communication rounds reduced to O (Log (L)) where L represents a bit length of the order of a ring, regardless of a secret sharing scheme.

Solution to Problem

In view of the above-mentioned problems, an aspect of the present invention is a secret equality determination system comprising a random number generation server device, a masked value restoration server device, and a plurality of secure computation server devices, which are connected to one another via a network, wherein the random number generation server device comprises:

a random number generation unit configured to generate a random number;

a first secret shared data generation unit configured to generate a first ring-share related to a value of a difference between two operands, to generate bit-shares of the random number, and to transmit the bit-shares of the random number to other server devices;

a share addition unit configured to add the random number to the first ring-share to generate masked secret shared data and to transmit the masked secret shared data to the masked value restoration server device;

a first determination bit-conjunction unit configured to perform first secret equality determination using the bit-shares of the random number and bit-shares of a restored value received from the masked value restoration server device and to transmit a first determined result to the other server devices; and a first secret shared data restoration unit configured to restore bit-shares of the first determined result based on the first determined result and determined results from the other server devices, wherein the masked value restoration server device comprises:

a second secret shared data generation unit configured to generate a second ring-share related to a value of a difference between the two operands and to generate the bit-shares of the restored value;

a second secret shared data restoration unit configured to restore a masked value using the second ring-share, a plurality of ring-shares which are fetched from the plurality of secure computation server devices, and the masked secret shared data received from the random number generation server device and to produce the restored value; and a second determination bit-conjunction unit configured to perform second secret equality determination using the bit-shares of the random number received from the random number generation server device and the bit-shares of the restored value and to transmit a second determined result to other server devices, wherein the second secret shared data restoration unit is configured to restore bit-shares of the second determined result based on the second determined result and determined results from the other server devices, wherein each of the plurality of secure computation server devices comprises:

a third secret shared data generation unit configured to generate a third ring-share related to a value of a difference between the two operands;

a third determination bit-conjunction unit configured to perform third secret equality determination using the bit-shares of the random number received from the random number generation server device and the bit-shares of the restored value received from the masked value restoration server device, and to transmit a third determined result to other server devices; and a third secret shared data restoration unit configured to restore bit-shares of the third determined result based on the third determined result and determined results from the other server devices.

In addition, another aspect of the present invention is a secret equality determination method in a random number generation server device, comprising the steps of generating a ring-share related to a value of a difference between two operands; generating a random number; adding the random number to the ring-share to generate masked secret shared data and transmitting the masked secret shared data to a masked value restoration server device: generating bit-shares of the random number; performing secret equality determination using the bit-shares of the random number and bit-shares of a restored value received from the masked value restoration server device and transmitting a determined result to other server devices; and restoring bit-shares of the determined result based on the determined result and determined results from the other server devices.

Furthermore, a different aspect of the present invention is a recording medium storing a secret equality determination program which causes a computer of a random number generation server device to execute a process of generating a ring-share related to a value of a difference between two operands; a process of generating a random number: a process of adding the random number to the ring-share to generate masked secret shared data and of transmitting the masked secret shared data to a masked value restoration server device; a process of generating bit-shares of the random number; a process of performing secret equality determination using the bit-shares of the random number and bit-shares of a restored value received from the masked value restoration server device and of transmitting a determined result to other server devices; and a process of restoring bit-shares of the determined result based on the determined result and determined results from the other server devices.

Advantageous Effect of Invention

According to the present invention, it is possible to improve communication traffic in secret equality determination, in which computed values, a determined result, and values in computation processes cannot be known, by improving constituent components with the number of communication rounds reduced to O (Log (L)). Herein, L is a bit length of the order of a ring. For instance, when the present invention is embodied by Non Patent Literature 5, it is possible to execute the secret equality determination with a less communication amount as compared with the secret equality determination in Non Patent Literature 2.

Further advantages of the present invention and example embodiments thereof will be explained in detail the following using description and drawings.

DESCRIPTION OF EMBODIMENTS

Now, example embodiments of the present invention will be described with reference to the drawings. However, a technical scope of the present invention is never restrictedly interpreted by the example embodiments which will be described in the following.

First Example Embodiment

Referring to FIGS. 1 to 7, description will proceed to a secret equality determination system according to a first example embodiment of the present invention.

Figure 1:
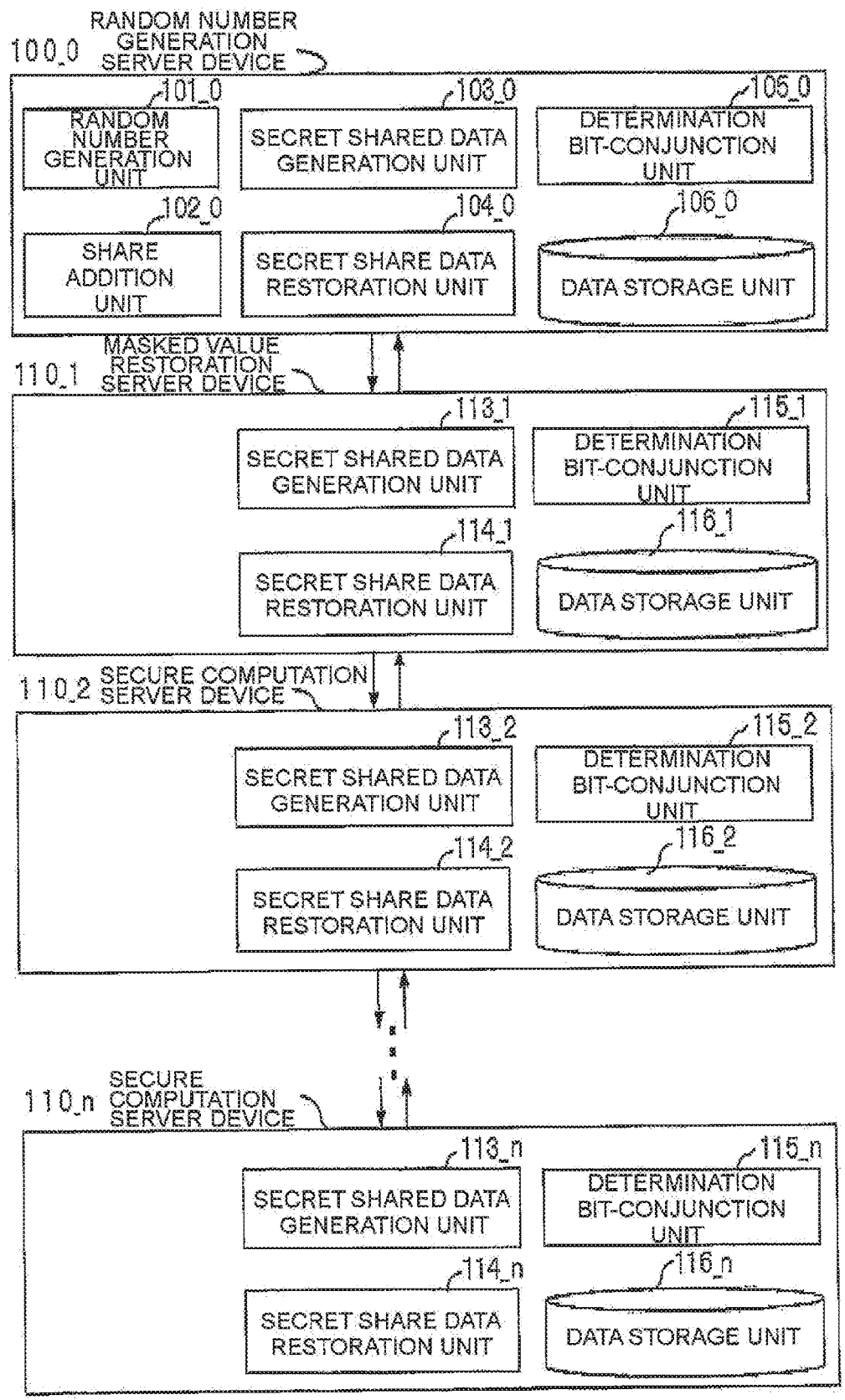
FIG. 1 is a block diagram for illustrating an example of a functional configuration of a secret equality determination system according to a first example embodiment of the present invention.

FIG. 1 is a block diagram for illustrating an example of a functional configuration of the secret equality determination system according to the first example embodiment of the present invention.

Referring to FIG. 1, the secret equality determination system according to the first example embodiment of the present invention comprises a random number generation server device 100_0 which will be referred to in FIG. 2 described later, a masked value restoration server device 110_1 which will be referred to in FIG. 3 described later, and second through n-th (n is an integer which is not less than two) server devices 110_2, ..., 110_n which will be referred to in FIG. 4 described later. In the secret equality determination system according the first example embodiment, each of the random number generation server device 100_0, the masked value restoration server device 110_1, and the second through the n-th server devices 110_2 to 110_n is communicably connected via a network to those server devices which are different from itself.

Figure 2:
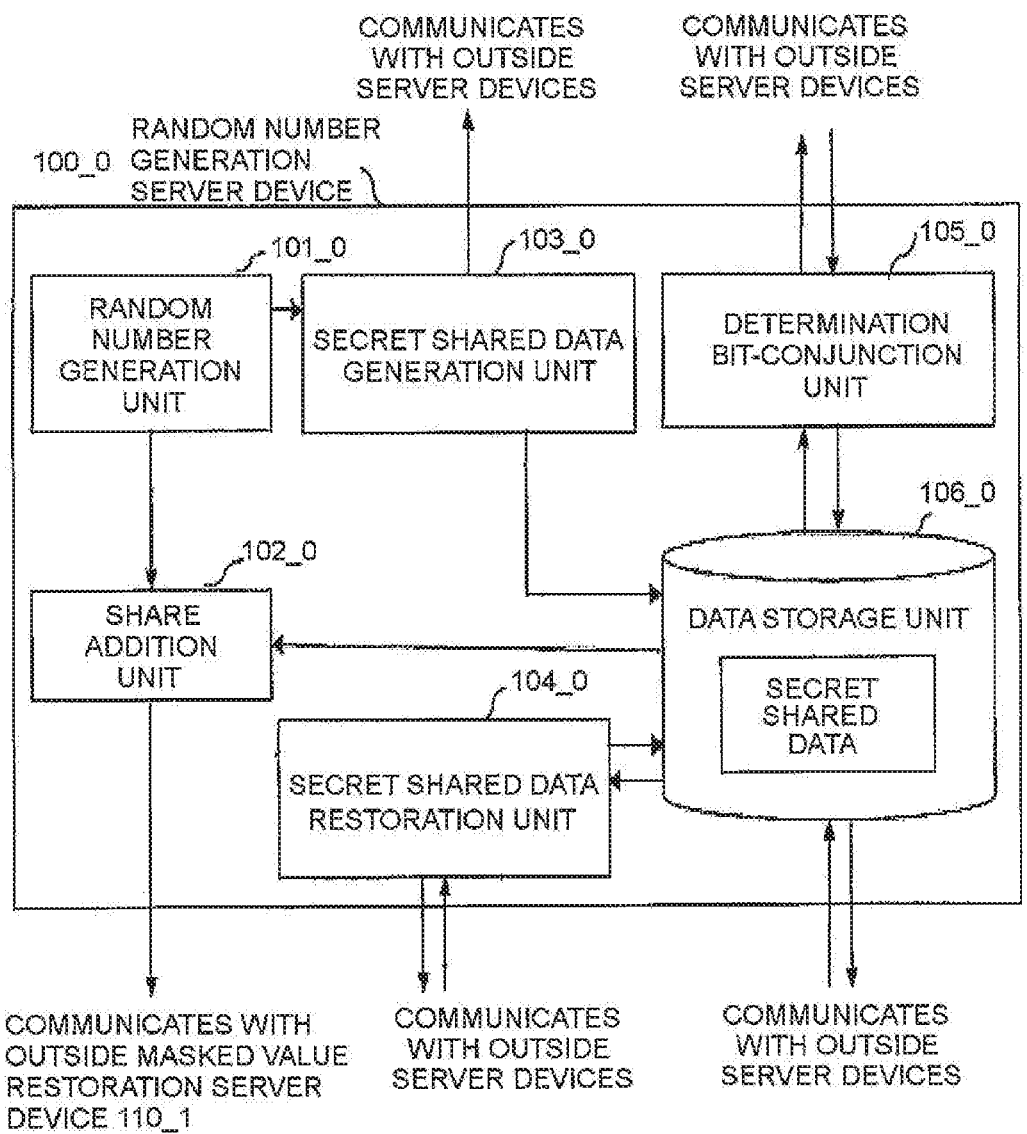
FIG. 2 is a block diagram for illustrating a functional configuration of a random number generation server device according to the first example embodiment of the present invention.

As shown in FIG. 2, the random number generation server device 100_0 comprises a random number generation unit 101_0, a share addition unit 102_0, a secret shared data generation unit 103_0, a secret shared data restoration unit 104_0, a determination bit-conjunction unit 105_0, and a data storage unit 106_0. The share addition unit 102_0 is communicably connected to the masked value restoration device 110_1 via the network. The secret shared data generation unit 103_0, the secret shared data restoration unit 104_0, the determination bit-conjunction unit, and the data storage unit 106_0 are communicably connected, via the network, to those server devices which are different from the server device including themselves, respectively. The random number generation unit 101_0 is communicably connected to the share addition unit 102_0 and the secret shared data generation unit 103_0. The data storage unit 106_0 is communicably connected to the share addition unit 102_0, the secret shared data generation unit 103_0, the secret shared data restoration unit 104_0, and the determination bit-conjunction unit 105_0, respectively.

Figure 3:
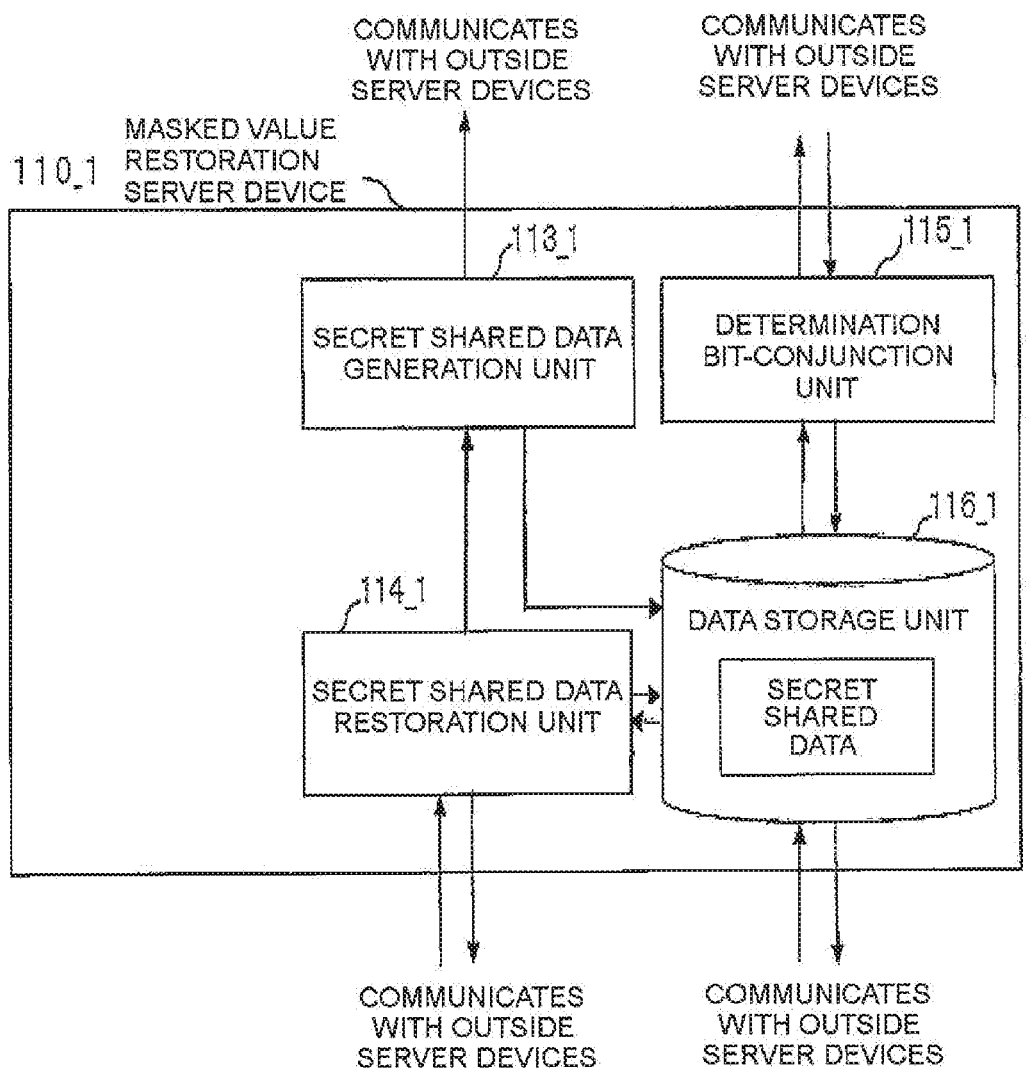
FIG. 3 is a block diagram for illustrating a functional configuration of a masked value restoration server device according to the first example embodiment of the present invention.

As shown in FIG. 3, the masked value restoration server device 110_1 comprises a secret shared data generation unit 113_1, a secret shared data restoration unit 114_1, a determination bit-conjunction unit 115_1, and a data storage unit 116_1. The secret shared data generation unit 113_1, the secret shared data restoration unit 114_1, the determination bit-conjunction unit 115_1, and the data storage unit 116_1 are communicably connected, via the network, to those server devices which are different from the server device including themselves, respectively. The data storage unit 116_1 is communicably connected to the secret shared data generation unit 113_1, the secret shared data restoration unit 114_1, and the determination bit-conjunction unit 115_1, respectively. The secret shared data generation unit 113_1 is communicably connected to the secret shared data restoration unit 114_1.

Figure 4:
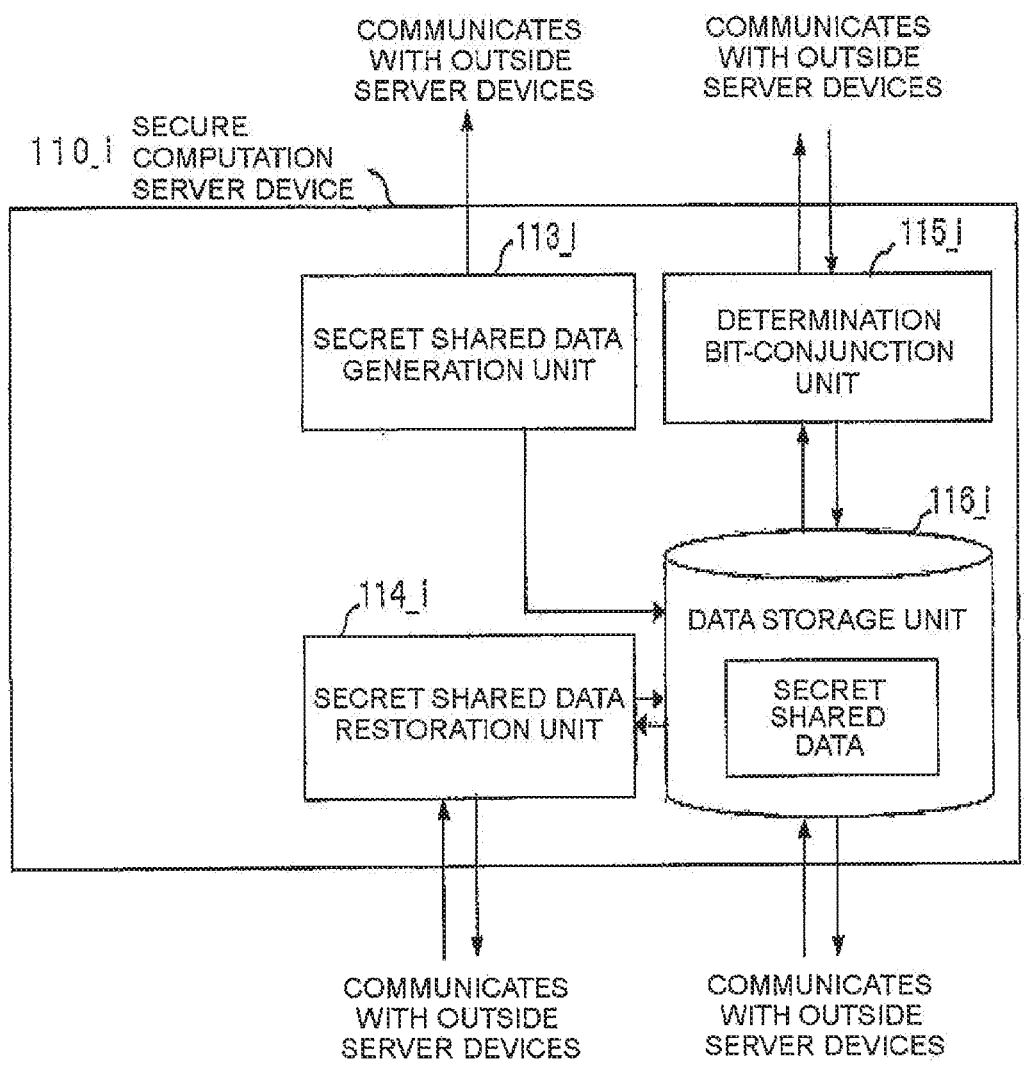
FIG. 4 is a block diagram for illustrating a functional configuration of a secure computation server device according to the first example embodiment of the present invention.

As shown in FIG. 4, an i-th secure computation server device 100_i (2≤i≤n) comprises an i-th secret shared data generation unit 113_i, an i-th secret shared data restoration unit 114_i, an i-th determination bit-conjunction unit 115_i, and an i-th data storage unit 116_i. The i-th secret shared data generation unit 113_i, the i-th secret shared data restoration unit 114_i, and the i-th determination bit-conjunction unit 115_i are communicably connected, via the network, to those server devices which are different from the server device including themselves, respectively. The i-th data storage unit 116_i is communicably connected to the i-th secret shared data generation unit 113_i, the i-th secret shared data restoration unit 114_i, and the i-th determination bit-conduction unit 115_i, respectively.

In the secret equality determination system of such a configuration, for either values a and b supplied to any device in the random number generation server device 100_0, the masked value restoration server device 110_1, and the second through the n-th server devices 110_2 to 110_n or secret shared data [a]_R and [b]_R stored in the data storage units 106_0, 116_1, 116_2 to 116_n, secret shared data of determined results indicative of whether or not a=b holds are computed without allowing the values of a and b to be known from the input thereof and from values in computation processes, and are stored in the data storage units 106_0, 116_1, 116_2 to 116_n, respectively. After being stored in the data storage units 106_0, 116_1, 116_2 to 116_n, the above-mentioned secret shared data of the determined results may be delivered to the secret shared data restoration units 104_0, 114_1, 114_2 to 114_n, respectively, to obtain restored results.

Figure 5:
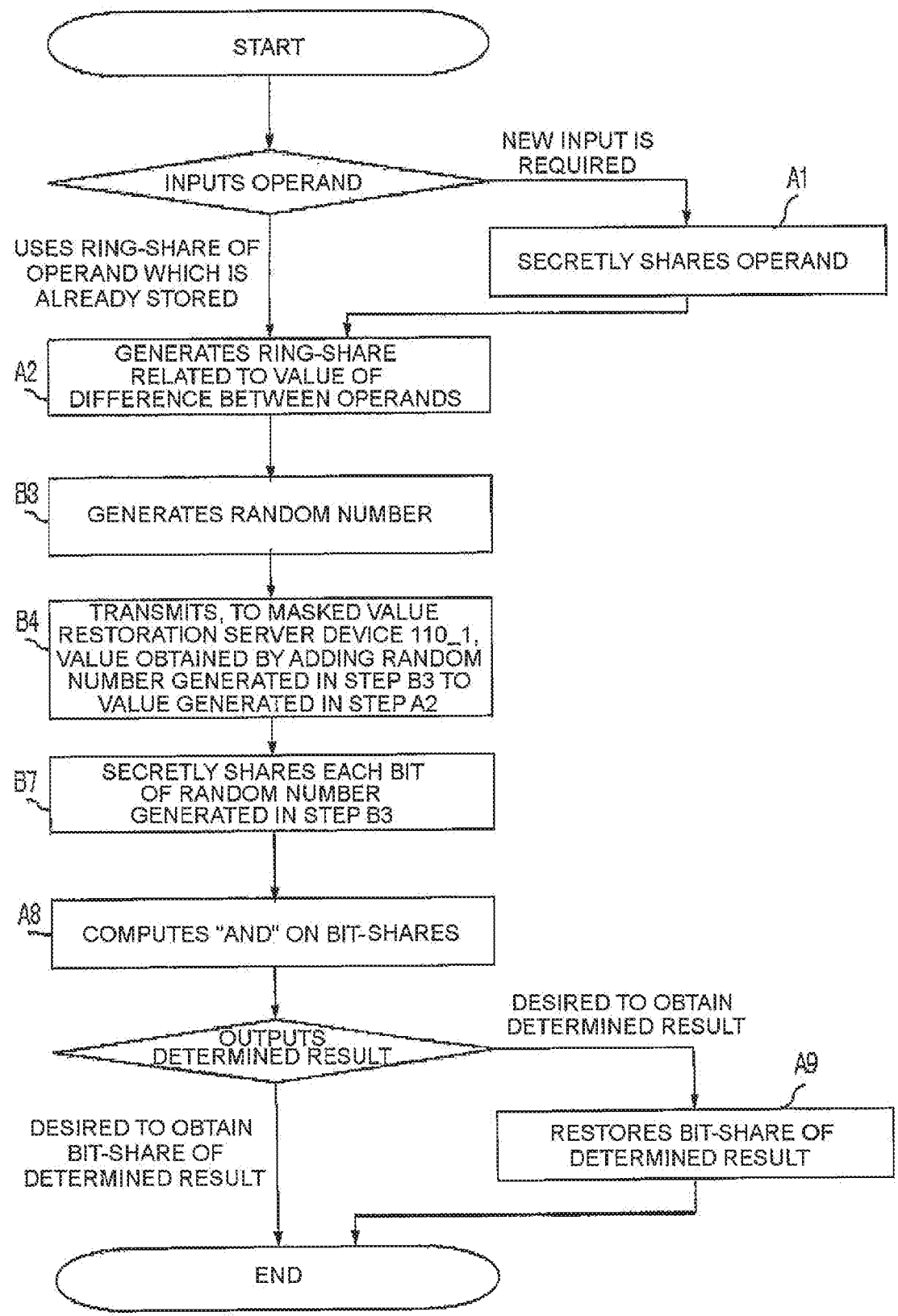
FIG. 5 is a flow chart for illustrating an example of operation of the random number generation server device according to the first example embodiment of the present invention.
Figure 6:
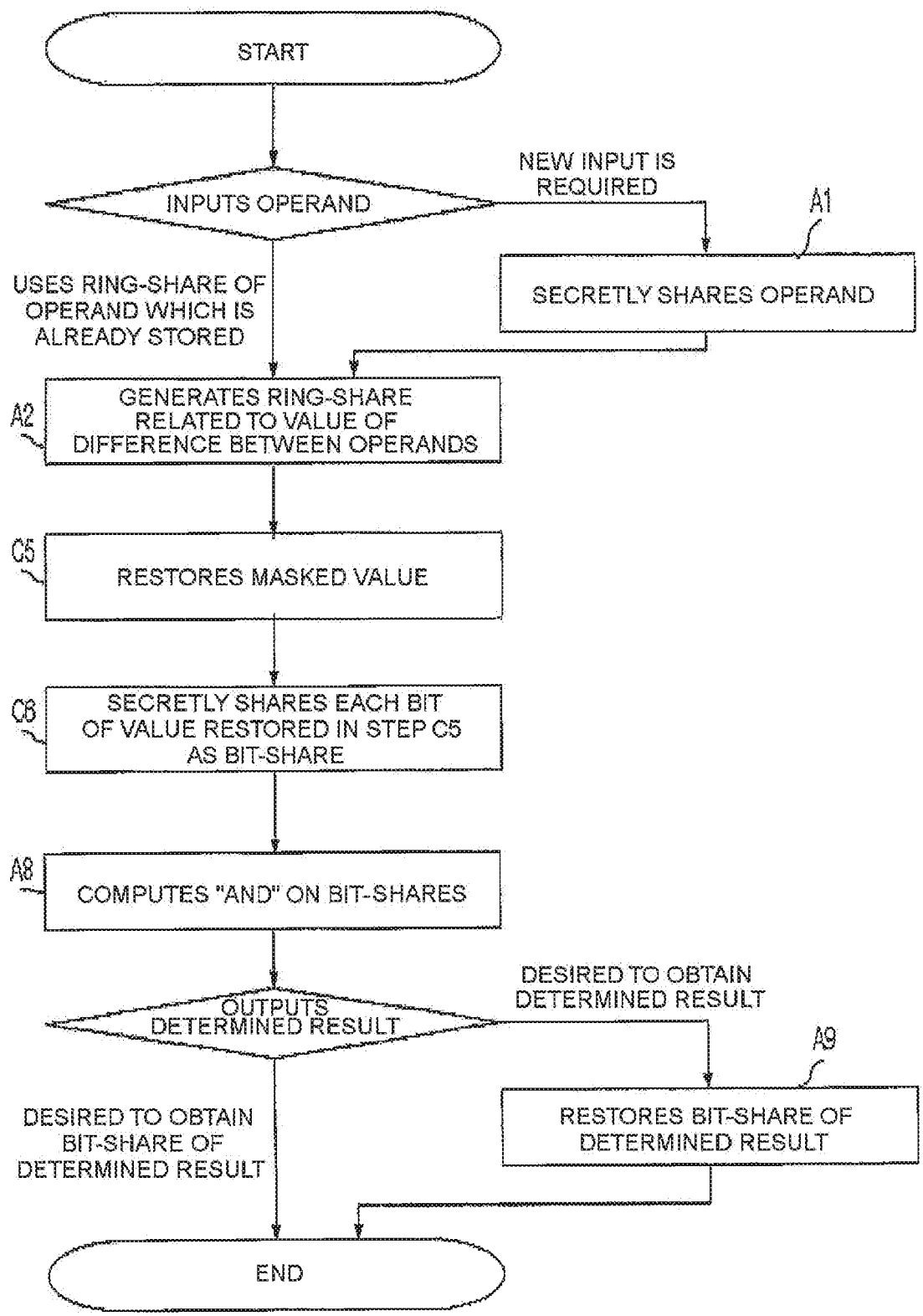
FIG. 6 is a flow chart for illustrating an example of operation of the masked value restoration server device according to the first example embodiment of the present invention.
Figure 7:
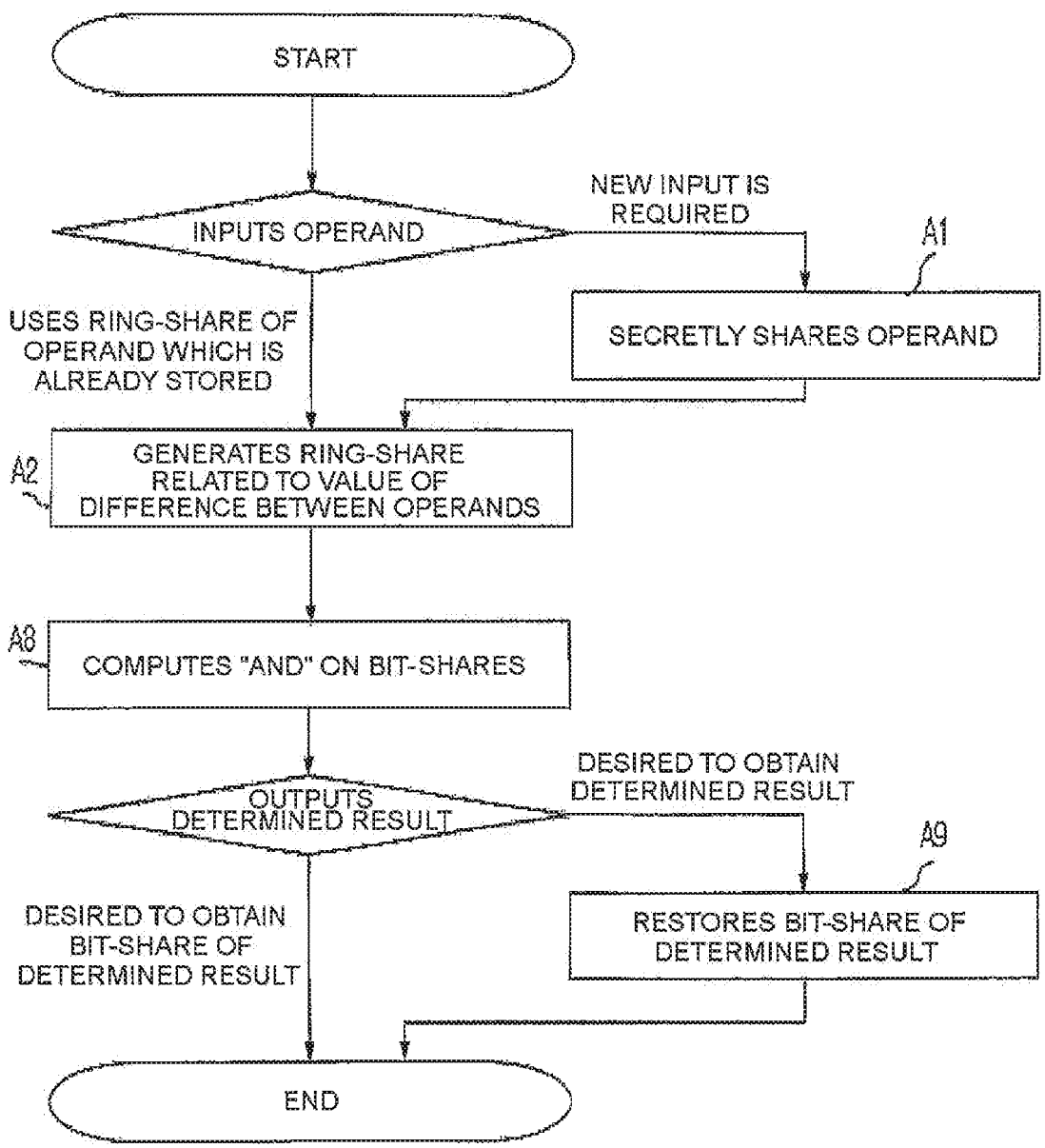
FIG. 7 is a flow chart for illustrating an example of operation of the secure computation server device according to the first example embodiment of the present invention.

Now, examples of operations of the secret equality determination system, the random number generation server device 100_0, the masked value restoration server device 110_1, and the i-th server device 110_i according to the first example embodiment of the present invention will be described in detail. FIG. 5 is a flow chart for illustrating an example of operation of the random number generation server device 100_0. FIG. 6 is flowchart for illustrating an example of operation of the masked value restoration server device 110_1. FIG. 7 is a flow chart for illustrating an example of operation of the i-th secure computation server device 110_i.

Herein, [a]_B means secret shared data of the value a on a ring of the order of 2. [a]_R means secret shared data of the value b on a ring of the order greater than 2. Hereinafter, [a]_B is called bit-shares of a whereas [b]_R is called a ring-share of b. Specifically, shares of the i-th server device 110_i are represented by [a]_Bi and [b]_Ri. In addition, shares of the random number generation server device 100_0 are represented by [a]_B0 and [b]_R0. Shares of the masked value restoration server device 110_1 are represented by [a]_B1 and [b]_R1.

For instance, it is assumed that the number of the server devices is equal to three, namely, n=3. In this event, the secret sharing used in Non Patent Literature 2 and Non Patent Literature 5 is cited as examples. Herein, it is assumed that:

$$\oplus, \cdot \qquad \text{[Math. 1]}$$

are an exclusive OR and an AND related to the bit-shares, respectively. It is noted that, hereinafter, they are also used as symbols of the exclusive OR and the AND as binary operators for elements on the ring of the order of 2. Herein, the following characteristics hold for the exclusive OR and the AND related to the bit-shares.

$$[a]\_B \oplus [b]\_B = [a \oplus b]\_B$$

$$[a]\_B \oplus c = [a \oplus c]\_B$$

$$[a]\_B \cdot [b]\_B = [a \cdot b]\_B$$

$$[a]\_B \cdot c = [a \cdot c]\_B \qquad \text{[Math. 2]}$$

Furthermore, it is assumed that + and − are an addition operator and a subtraction operator related to the ring-share, respectively. It is noted that, hereinafter, they are also used as the addition operator and the subtraction operator as binary operators for elements on the ring of the order greater than 2. Herein, the following characteristics hold for the addition operator and the subtraction operator related to the ring-share.

$$[a]\_R + [b]\_R = [a+b]\_R$$

$$[a]\_R - [b]\_R = [a-b]\_R \qquad \text{[Math. 3]}$$

For instance, it is assumed that the number of the server devices is equal to three, namely, n=3. In this event, in Non Patent Literature 5, the exclusive OR related to the bit-shares can be computed without requiring communication. In addition, in Non Patent Literature 5, the AND related to the bit-shares can be computed with a communication cost of three bits per one round.

In addition, it is assumed that each of a and b has a bit length of L on determining whether or not a=b holds. That is, the ring-share has the bit length of L. Furthermore, as a result of the secret equality determination, [1]_B is produced if the equality holds and [0]_B is produced if it does not hold.

(Step A1)

Referring to FIGS. 5 to 7, as an operation of the random number generation server device 100_0, or the masked value restoration server device 110_1, or the i-th server device 110_i, first, an input device which is not shown in the figure delivers an input (first operand) a to the secret shared data generation unit 103_0, or 113_1, or 113_i. The secret shared data generation unit 103_0, or 113_1, or 113_i generates a ring-share [a]_R of the first operand a. The random number generation server device 100_0 saves [a]_R0 in the data storage unit 106_0. The masked value restoration server device 110_1 saves [a]_Ri in the data storage unit 116_1. The i-th secure computation server device 110_i saves [a]_Ri in the i-th data storage unit 116_i. Having generated the ring-share [a]_R of the first operand a, the random number generation server device 100_0, or the masked value restoration server device 110_1, or the i-th server device 110_i delivers [a]_Ri' corresponding to a suffix i' to those server devices which are different from itself. For instance, if i'=0, the random number generation server device 100_0 saves [a]_R0 in the data storage unit 106_0. If i'=1, the masked value restoration server device 110_1 saves [a]_R1 in the data storage unit 116_1. Otherwise, the i'-th secure computation server device 110_i' saves [a]_Ri' in the i'-th data storage unit 116_i'. For an input (second operand) b also, similar processing is carried out. The step A1 is a step which takes place only on starting computation. Accordingly, in a case where the secret equality determination is carried out for the ring-share which is produced during processes of the secure computation protocol, the step A1 does take place.

(Step A2)

Next, the random number generation device 100_0, the masked value restoration server device 110_1, and the i-th secure computation server device 110_i generate ring-shares [a]_R−[b]_R=[a−b]_R related to a value of a difference between the two operands from values of [a]_R and [b]_R which are saved in their respective data storage units 106_0, 116_1, and 116_i. After generation, the random number generation device 100_0, the masked value restoration server device 110_1, and the i-th secure computation server device 110_i save [a−b]R0, [a−b]R1, and [a−b]_Ri in their respective data storage units 106_0, 116_1, and 116_i.

(Step B3)

Referring to FIG. 5, the random number generation unit 101_0 included in the random number generation server device 100_0 generates a random number r as a value on the ring of the order greater than 2. After generation, the random number generation unit 101_0 delivers the random number r to the share addition unit 102_0 and the secret shared data generation unit 103_0.

(Step B4)

The share addition unit 102_0 included in the random number generation server device 100_0 fetches, from the data storage unit 106_0, the ring-share [a−b]_R0 related to the value of the difference between the two operands. The share addition unit 102_0 delivers, to the secret shared data restoration unit 114_1 included in the masked value restoration server device 110_1, as masked secret shared data. [a−b+r]_R0 (=[a−b]_R0+r) obtained by adding the random number r to the ring-share [a−b]_R0 related to the value of the difference between the two operands.

(Step C5)

Referring to FIG. 6, the secret shared data restoration unit 114_1 included in the masked value restoration server device 110_1 fetches, from the data storage unit 116_1, the ring-share [a−b]_R1 related to the value of the difference between the two operands. In addition, the ring-share [a−b]_Ri related to the value of the difference between the two operands is fetched from the i-th secure computation server device 110_i (2≤i≤n). In this event, when the number of the secret shared data required to restore data is k, the number of fetched [a−b]_Ri is equal to (k−2). The secret shared data restoration unit 114_1 restores a masked value a−b+r using the ring-share [a−b]_Ri related to the value of the difference between the two operands, (k−2) ring-shares related to the value of the difference between the two operands, and the masked secret shared data [a−b+r] delivered in the above-mentioned step B4. After restoration, the secret shared data restoration unit 114_1 delivers the restored value a−b+r to the secret shared data generation unit 113_1.

(Step C6)

The secret shared data generation unit 113_1 generates a bit-share for each bit of the restored value a−b+r delivered in the above-mentioned step C5. Herein, it is assumed that a t-th bit (t=0, . . . , L−1) of the restored value a−b+r has a value of (a−b+r)_t. In this event, the bit-share for each bit of the restored value a−b+r indicates [(a−b+r)_t]_B. After generation of [(a−b+r)_t]_B, the secret shared data generation unit 113_1 transmits bit-shares [(a−b+r)_t]_Bi of the restored value to the outside i-th secure computation server device 110_i corresponding to a suffix i. That is, the random number generation server device 100_0, the masked value restoration server device 110_1, and the i-th secure computation server device 110_i save the bit-shares [(a−b+r)_t]_B0, [(a−b+r)_t]_B1, and [(a−b+r)_t]_Bi of the restored values in their respective data storage units 106_0, 116_1, and 116_i.

(Step B7)

Turning back to FIG. 5, the secret shared data generation unit 103_0 included in the random number generation server device 100_0 generates a bit-share for each bit of the random number r which is sent in the step B3. Herein, it is assumed that a t-th bit (t=0, . . . , L−1) of the random number r has a value of r_t. In this event, the bit-share for each bit of the random number r indicates [r_t]_B. After generation of [r_t]_B, the secret shared data generation unit 103_0 transmits bit-shares [r_t]_Bi of the random number to the outside i-th secure computation server device 110_i corresponding to the suffix i. That is, the random number generation server device 100_0, the masked value restoration server device 110_1, and the i-th secure computation server device 110_i save the bit-shares [r_t]_B0, [r_t]_B1, and [r_t]_Bi of the random number in their respective data storage units 106_0, 116_1, and 116_i, respectively.

(Step A8)

Referring to FIGS. 5 to 7, it is assumed here that c_t (t=0, . . . , L−1) represents each bit of c when the restored value c=a−b+r. The determination bit-conjunction units 105_0, 115_1, and 115_i, which are included in the random number generation server device 100_0, the masked value restoration server device 110_1, and the i-th secure computation server device 110_i, respectively, perform computation of $$[res]\_Bi = \wedge_{t=0}^{\ell-1} (1 \oplus [c\_t]\_Bi \oplus [r\_t]\_Bi) \qquad \text{[Math. 4]}$$

After the computation is finished, the determination bit-conjunction units 105_0, 115_1, and 115_i store determined results [res]_B, [res]_B1, and [res]_Bi in the data storage units 106_0, 116_1, and 116_i, respectively. In addition, a circuit depth for executing the computation of:

$$\wedge_{t=0}^{\ell-1} (1 \oplus [c\_t]\_Bi \oplus [r\_t]\_Bi) \qquad \text{[Math. 5]}$$

is equal to Log (L).

(Step A9)

In a case of obtaining a result of equality determination, the secret shared data restoration units 104_0, 104_1, and 104_i, which are included in the random number generation server device 100_0, the masked value restoration server device 110_1, and the i-th secure computation server device 110_1, respectively, fetch [res]_B0, [res]_B1, and [res]_Bi from their respective data storage units 106_0, 116_1, and 116_i, respectively, and transmit them to the outside server devices. Simultaneously, the secret shared data restoration units 104_0, 114_1, and 114_i restore determined results indicative of whether or not a=b holds, using the determined result [res]_Bj obtained from the outside server devices.

The first example embodiment of the present invention described above has effects which will be described in the following.

A first effect is that, among costs required for the secret equality determination, the number of communication rounds can be reduced to O (Log (L)) regardless of the secret sharing scheme. This is because items of communication rounds only comprise communication rounds required to share the secret shared data and communication rounds required to compute the determined results [res]_B. Specifically, different from Non Patent Literature 2, the first example embodiment can execute, by adding the steps B6 and C7, the sharing of the secret shared data without depending on the additive secret sharing method in Non Patent Literature 2. Thus, by improving the constituent components, it is possible to reduce the communication traffic, among costs required for the secret equality determination, while the number of communication rounds is reduced to O (Log (L)). For instance, when the first example embodiment is embodied with Non Patent Literature 5, the number of communication rounds is equal to (Log (L)+2) and the communication traffic is equal to (12L−3) bits. When the secret equality determination is carried out in Non Patent Literature 2, the number of communication rounds is equal to (Log (L)+1) and the communication traffic is equal to (17L−15) bits. Therefore, the communication traffic is further reduced when the first example embodiment is embodied with Non Patent Literature 5.

Second Example Embodiment

Subsequently, referring to FIGS. 8 to 16, description will proceed to a secret equality determination system according to a second example embodiment of the present invention. The secret equality determination system according to the second example embodiment of the present invention is a modification of the secret equality determination system according to the first example embodiment of the present invention described above. Hereinafter, in the second example embodiment, those parts, which are similar in functions to the parts already described in the first example embodiment, are assigned with the same symbols and description thereof is omitted.

Figure 8:
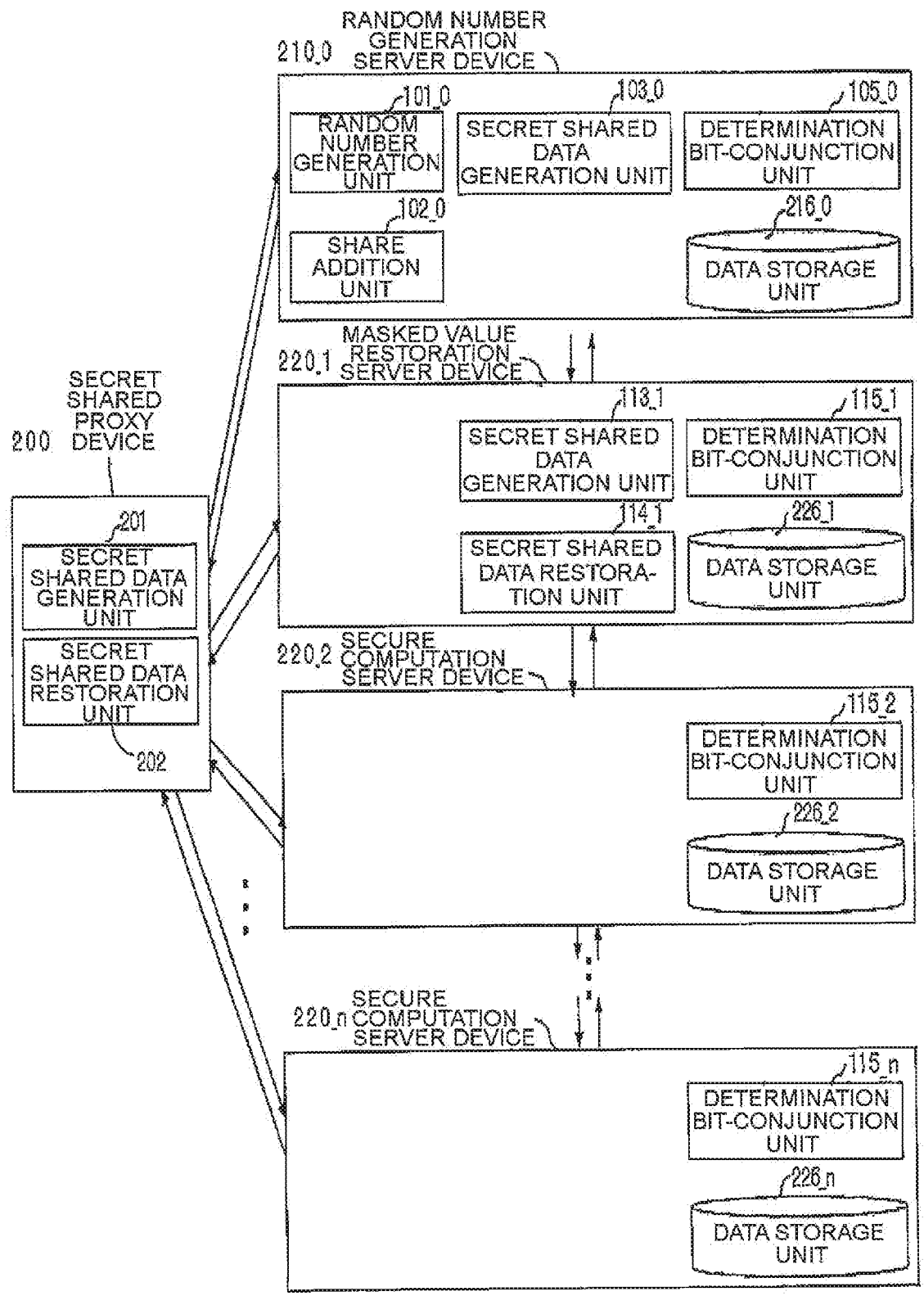
FIG. 8 is a block diagram for illustrating an example of a functional configuration of a secret equality determination system according to a second example embodiment of the present invention.

FIG. 8 is a block diagram for illustrating an example of a functional configuration of the secret equality determination system according to the second example embodiment.

Referring to FIG. 8, the secret equality determination system according to the second example embodiment of the present invention comprises a secret shared proxy device 200, which will be referred to in FIG. 9 described later, a random number generation server device 210_0, which will be referred to in FIG. 10 described later, a masked value restoration server device 220_1, which will referred to in FIG. 11 described later, and second through n-th (n is an integer which is not less than two) secure computation server devices 220_2, . . . , 220_n, which will be referred to in FIG. 12 described later. In the secret equality determination system according to the second example embodiment, the secret shared proxy device 200 is communicably connected via a network to the random number generation server device 210_0, the masked value restoration server device 220_1, and the second through the n-th secure computation server devices 220_2 to 220_n. In addition, the random number generation server device 210_0, the masked value restoration server device 220_1, and each of the second through the n-th server devices 220_2 to 220_n are communicably connected via the network to those server devices which are different from itself.

Figure 9:
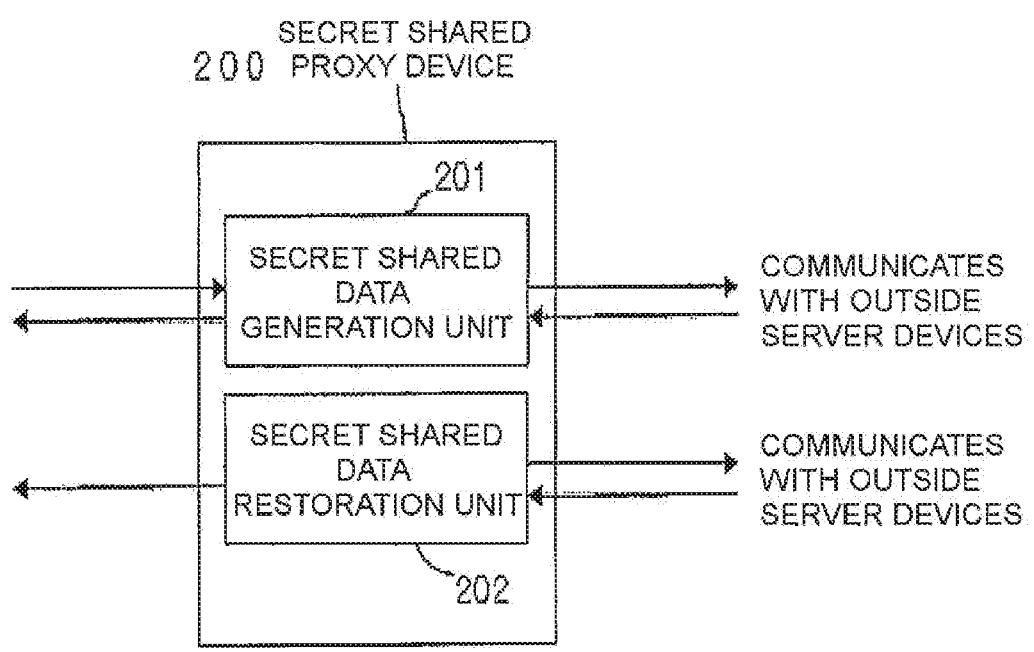
FIG. 9 is a block diagram for illustrating a functional configuration of a secret shared proxy device according to the second example embodiment of the present invention.

As shown in FIG. 9, the secret shared proxy device 200 comprises a secret shared data generation unit 201 and a secret shared data restoration unit 202. The secret shared data generation unit 201 and the respective server devices 210_0, 220_1, and 220_2 to 220_n are communicably connected via the network. The secret shared data restoration unit 202 and the respective server devices 210_0, 220_1, and 220_2 to 220_n are communicably connected via the network.

Figure 10:
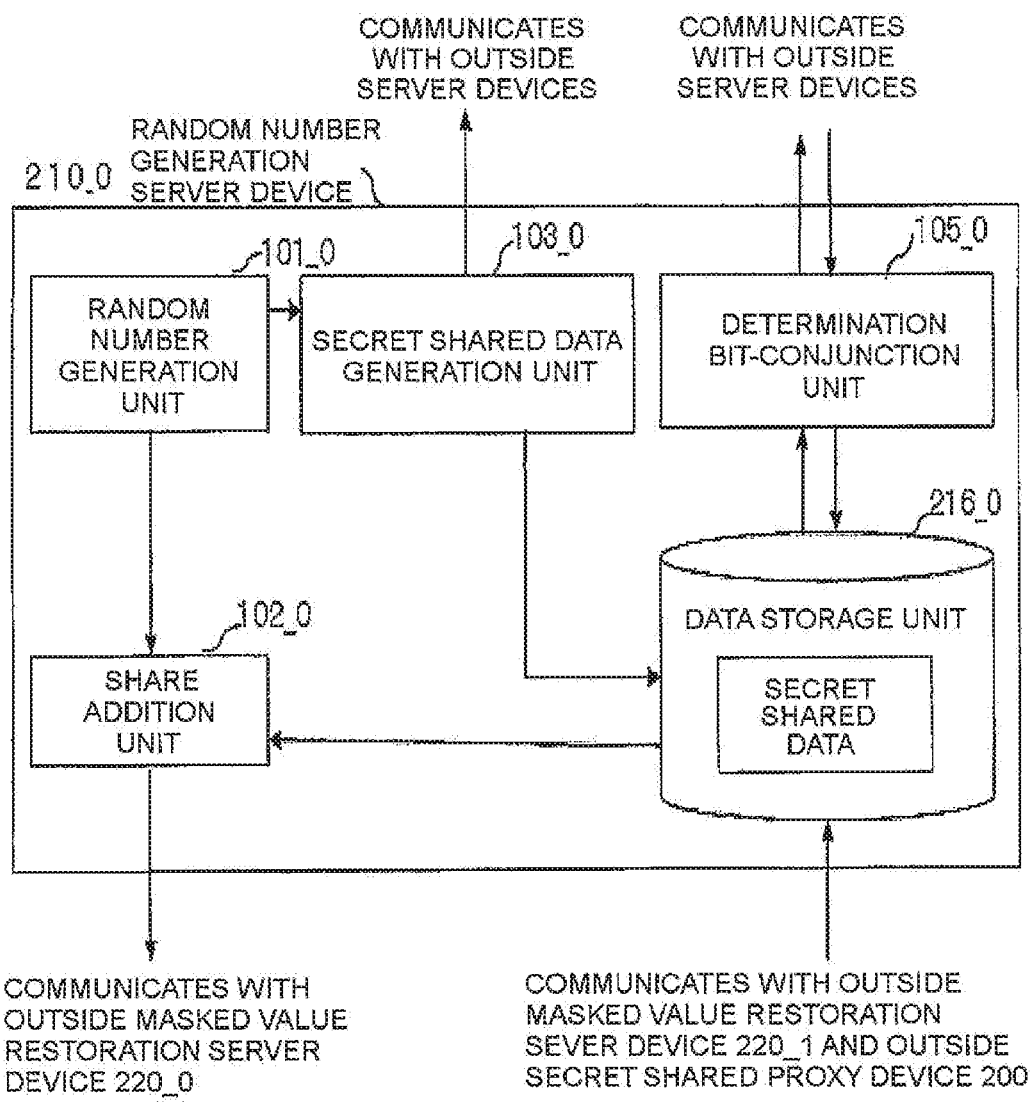
FIG. 10 is a block diagram for illustrating a functional configuration of a random number generation server device according to the second example embodiment of the present invention.

As shown in FIG. 10, the random number generation server device 210_0 comprises the random number generation unit 101_0, the share addition unit 102_0, the secret shared data generation unit 103_0, the determination bit-conjunction unit 105_0, and a data storage unit 216_0. The share addition unit 102_0 is communicably connected to the masked value restoration server device 200_1 via the network. The secret shared data generation unit 103_0 and the determination bit-conjunction unit 105_0 are communicably connected via the network to the server devices 220_1, 220_2, . . . , and 220_n on the outside which are different from themselves. The data storage unit 216_0 is communicably connected via the network to the secret shared proxy device 200 on the outside and the masked value restoration server device 220_1 on the outside. The random number generation unit 101_0 is communicably connected to the share addition unit 102_0 and the secret shared data generation unit 103_0. The data storage unit 216_0 is communicably connected to the share addition unit 102_0, the secret shared data generation unit 103_0, and the determination bit-conjunction unit 105_0.

Figure 11:
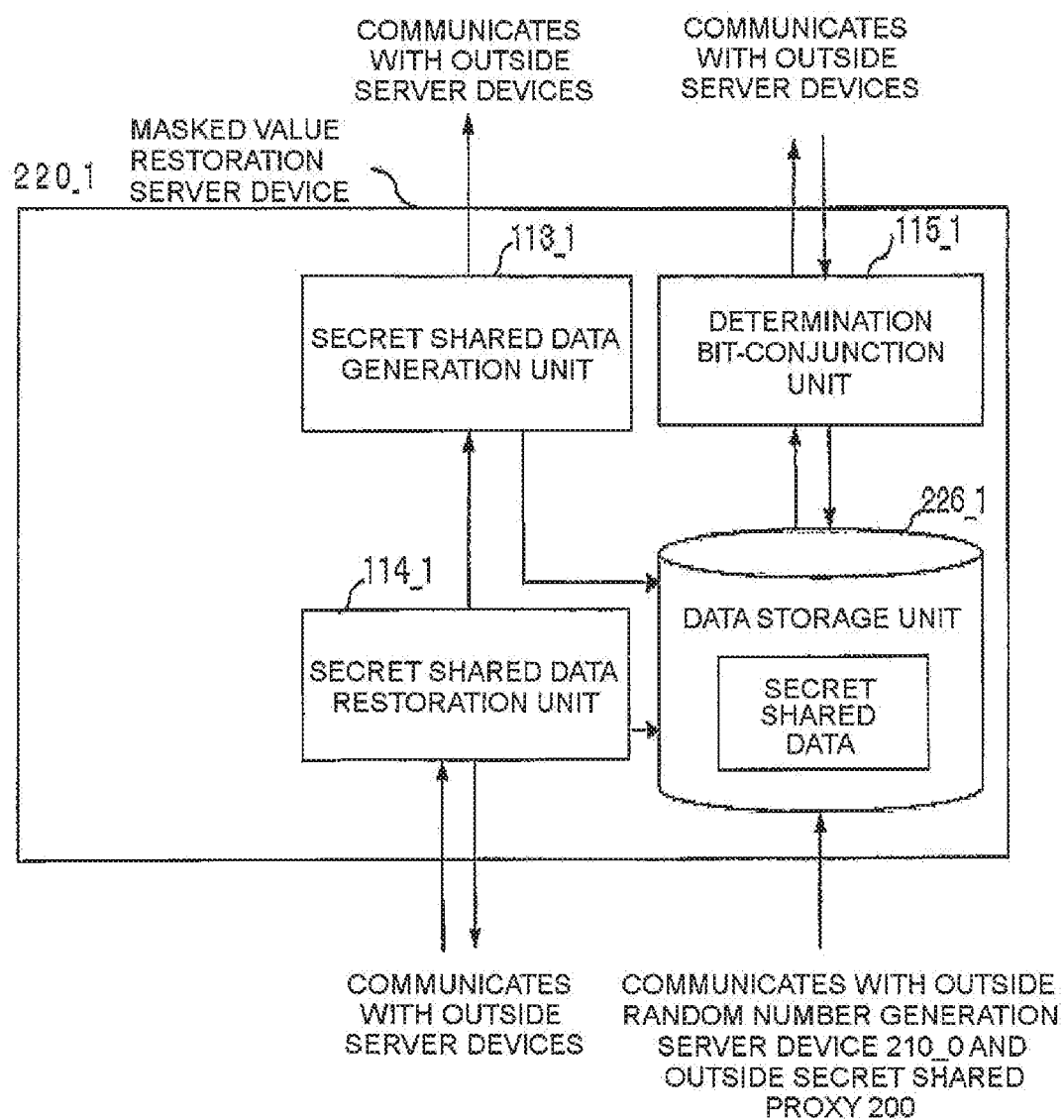
FIG. 11 is a block diagram for illustrating a functional configuration of a masked value restoration server device according to the second example embodiment of the present invention.

As shown in FIG. 11, the masked value restoration server device 220_1 comprises the secret shared data generation unit 113_1, the secret shared data restoration unit 114_1, the determination bit-conjunction unit 115_1, and a data storage unit 226_1. The secret shared data generation unit 113_1, the secret shared data restoration unit 114_1, and the determination bit-conjunction unit 115_1 are communicably connected via the network to the server devices 220_0, 220_2, . . . , and 220_n on the outside which are different from themselves. The data storage unit 226_1 is communicably connected via the network to the secret shared proxy device 200 on the outside and the random number generation server device 210_0 on the outside. The data storage unit 226_1 is communicably connected to the secret shared data generation unit 113_1, the secret shared data restoration unit 114_1, and the determination bit-conjunction unit 115_1. The secret shared data generation unit 113_1 and the secret shared data restoration unit 114_1 are communicably connected to each other.

Figure 12:
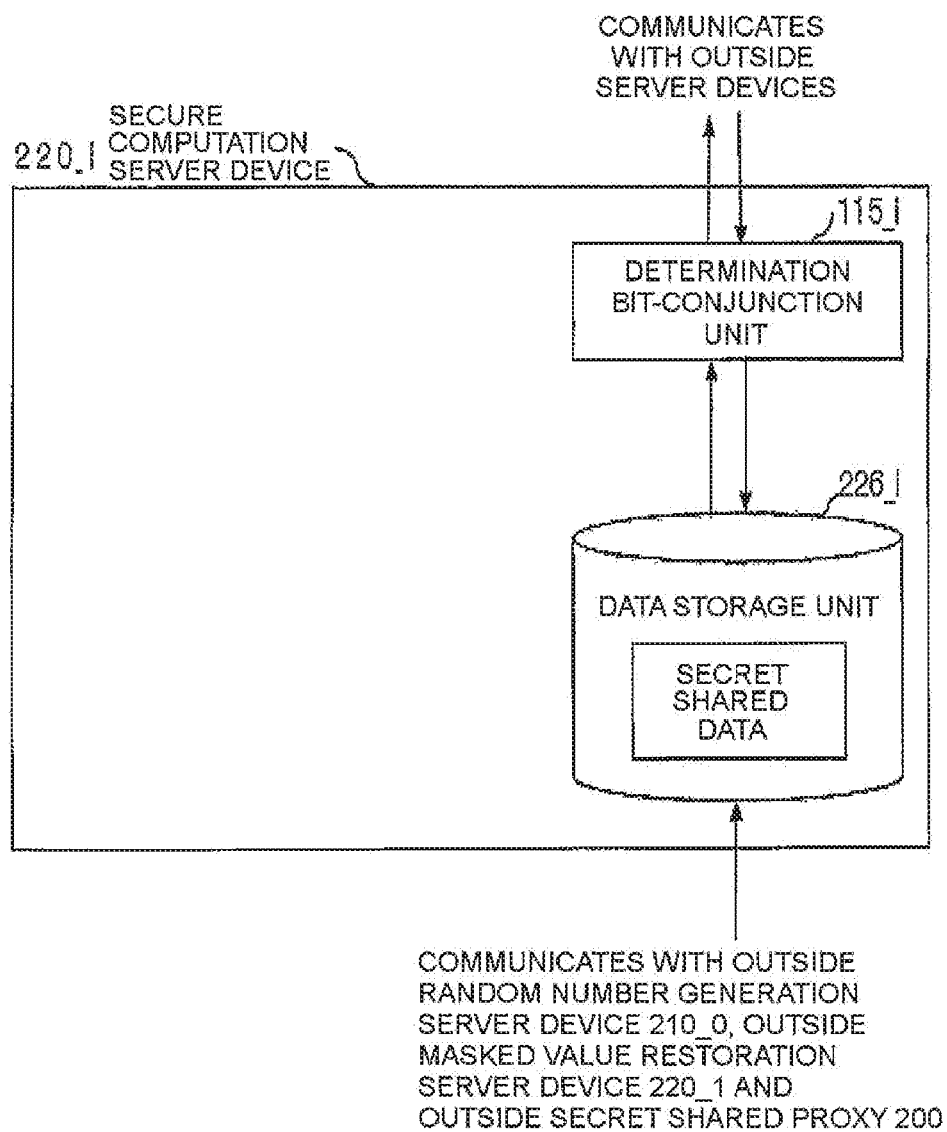
FIG. 12 is a block diagram for illustrating a functional configuration of a secure computation server device according to the second example embodiment of the present invention.

As shown in FIG. 12, an i-th secure computation server device 220_i (2≤i≤n) comprises the i-th determination bit-conjunction unit 115_i and an i-th data storage unit 226_i. The i-th determination bit-conjunction unit 115_i and the i-th data storage unit 226_i are communicably connected via the network to the secret shared proxy device 200 on the outside and the server devices 210_0, 220_1, and 220_i' on the outside (i'≠i, 2≤i'≤n). The i-th determination bit-conjunction unit 115_i and the i-th data storage unit 226_i are communicably connected to each other.

In the secret equality determination system, the secret shared proxy device 200, the random number generation server device 210_0, the masked value restoration server device 220_1, and the second through the n-th secure computation server devices 220_2, . . . , to 220_n according to the second example embodiment, for either values a and b supplied from an input device, which is not shown in the figure, to the secret shared proxy device 200, or secret shared data [a]_R and [b]_R stored in the data storage units 216_0, 226_1, 226_2, . . . , to 226_n, secret shared data of determined results indicative of whether or not a=b holds are computed without allowing the values of a and b to be known from the input thereof and values in computation processes, and are stored in the storage units 216_0, 226_1, 226_2, . . . , to 226_n, respectively. After being stored in the data storage units 216_0, 226_1, 226_2, . . . , to 226_n, the above-mentioned secret shared data of the determined results may be delivered to the secret shared proxy device 200, respectively, to obtain restored results.

Figure 13:
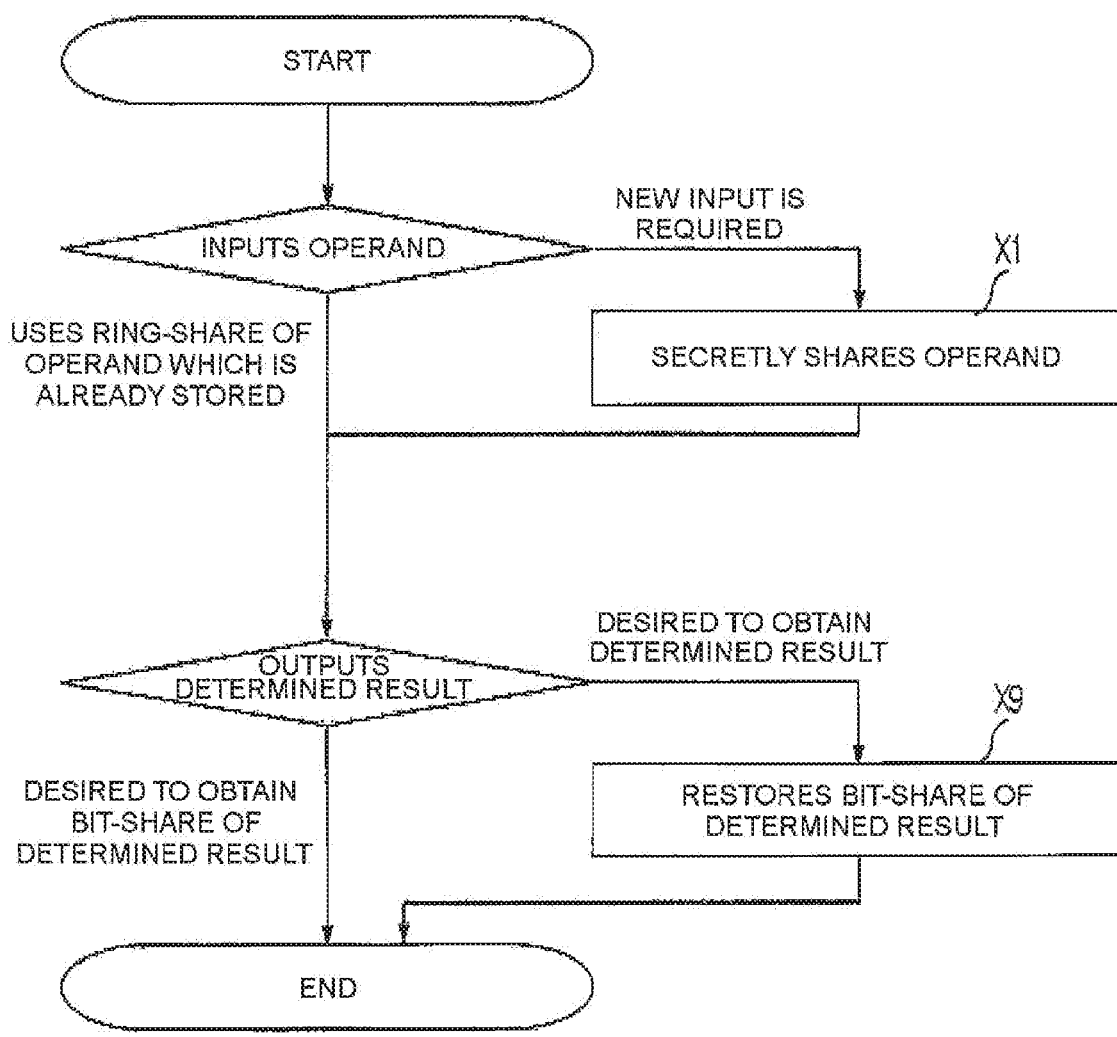
FIG. 13 is a flow chart for illustrating an example of operation of the secret shared proxy device according to the second example embodiment of the present invention.
Figure 14:
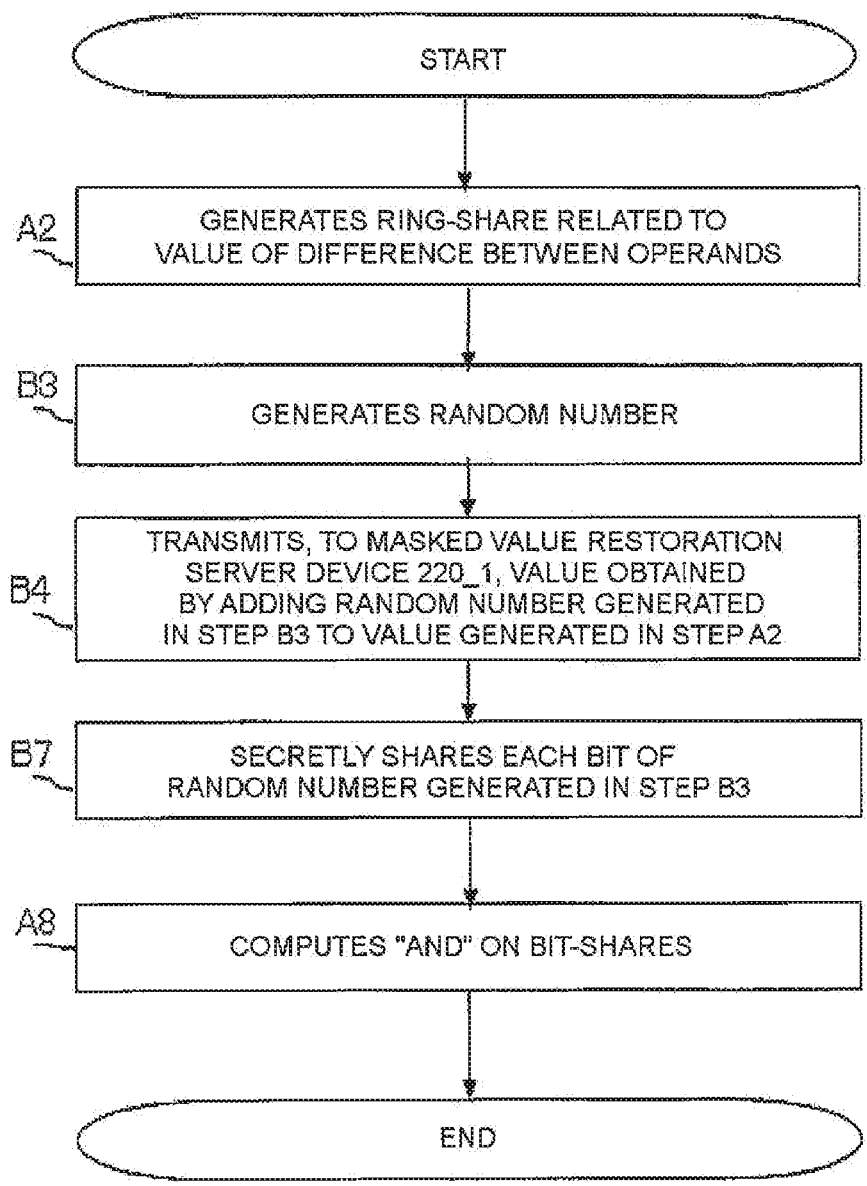
FIG. 14 is a flow chart for illustrating an example of operation of the random number generation server device according to the second example embodiment of the present invention.
Figure 15:
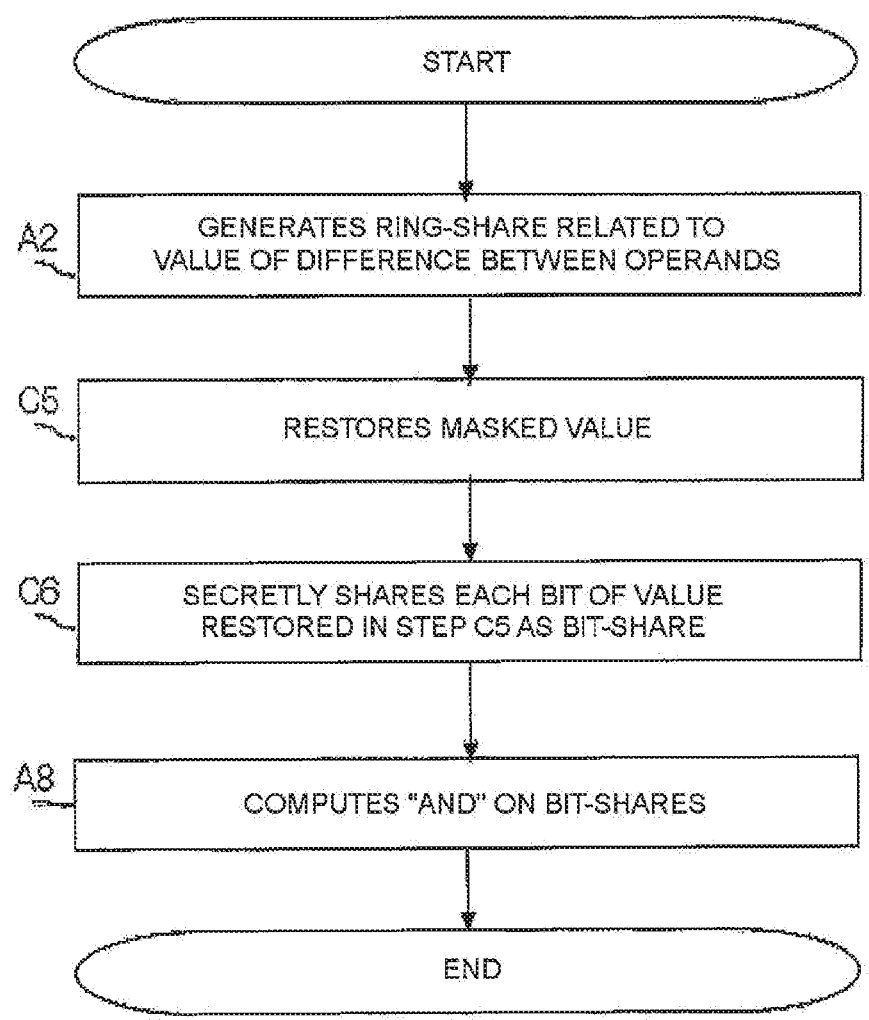
FIG. 15 is a flow chart for illustrating an example of operation of the masked value restoration server device according to the second example embodiment of the present invention.
Figure 16:
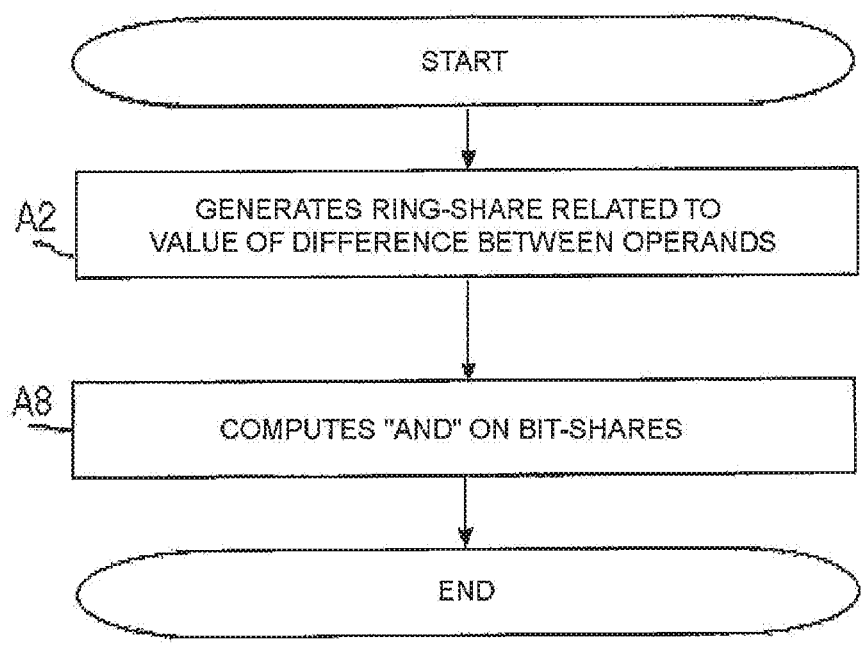
FIG. 16 is a flow chart for illustrating an example of operation of the secure computation server device according to the second example embodiment of the present invention.

Now, operations of the secret equality determination system, the secret shared proxy device 200, the random number generation server device 210_0, the masked value restoration server device 220_1, and the i-th secure computation server device 220_i according to the second example embodiment of the present invention will be described in detail. FIG. 13 is a flow chart for illustrating an example of operation of the secret shared proxy device 200. FIG. 14 is a flow chart for illustrating an example of operation of the random number generation server device 210_0. FIG. 15 is a flow chart for illustrating an example of operation of the masked value restoration server device 220_1. FIG. 16 is a flow chart for illustrating an example of operation of the i-th secure computation server device 220_i.

(Step X1)

Referring to FIG. 13, as an operation of the secret shared proxy device 200, first, an input (first operand) a is delivered from an input device, which is not shown in the figure, to the secret shared data generation unit 201. The secret shared data generation unit 201 generates a ring-share [a]_R related to the first operand. Next, the secret shared data generation unit 201 delivers ring-shares [a]_R, [a]_R1, and [a]_R i related to the first operand to the data storage unit 216_0 included in the random number generation server device 210_0, the data storage unit 216_1 included in the masked value restoration server device 220_1, and the data storage unit 216_i included in the i-th secure computation server device 220_i (2≤i≤n), respectively. The data storage units 216_0, 226_1, and 226_i store the ring-shares [a]_R0, [a]_R1, and [a]_R i related to the first operand, respectively. For an input (second operand) b also, the secret shared proxy device 200 and the outside server devices 210_0, 220_1, and 220_i on the outside perform similar processes. Herein, the Step X1 is a step which takes place only on starting computation. Accordingly, in a case where the secret equality determination is carried out about the ring-share which is generated in the processes of the secure computation protocol, the Step X1 does not take place.

(Step A2)

Referring to FIGS. 14 to 16, a step A2 is equivalent to the step A2 in the operation of the respective server devices according to the first example embodiment. However, the random number generation server device 210_0, the masked value restoration server device 220_1, and the i-th secure computation server device 220_i save ring-shares [a−b]_R0, [a−b]_R1, and [a−b]_Ri related to a value of a difference between the two operands in the data storage units 216_0, 226_1, and 226_i, respectively.

(Step B3)

Referring to FIG. 14, a step B3 in the operation of the random number generation server device 210_0 according to the second example embodiment is equivalent to the step B3 in the operation of the random number generation server device 100_0 according to the first example embodiment.

(Step B4)

A step B4 in the operation of the random number generation server device 210_0 according to the second example embodiment is equivalent to the step B4 in the operation of the random number generation server device 100_0 according to the first example embodiment. However, the share addition unit 102_0 delivers the masked secret shared data [a−b+r]_R0 (=[a−b]_R0+r) to the secret shared data restoration unit 114_1 included in the masked value restoration server device 220_1.

(Step C5)

Referring to FIG. 15, a step C5 in the operation of the masked value restoration server device 220_1 according to the second example embodiment is equivalent to the step C4 in the operation of the masked value restoration server device 110_1 according to the first example embodiment. However, the ring-share [a−b]_R1 related to the value of the difference between the two operands is fetched from the data storage unit 226_1. In addition, the ring-share [a−b]_Ri related to the value of the difference between the two operands is fetched from the i-th secure computation server device 110_i (2≤i≤n).

(Step C6)

A step C6 in the operation of the masked value restoration server device 220_1 according to the second example embodiment is equivalent to the step C6 in the operation of the masked value restoration server device 110_1 according to the first example embodiment. However, bit-shares [(a−b+r)_t]_B0, [(a−b+r)_t]_B1, and [(a−b+r)_t]_Bi of the restored value are transmitted to the random number generation server device 210_0, the masked value restoration server device 220_1, and the i-th secure computation server device 220_i, respectively, and are saved in their respective data storage units 216_0, 226_1, and 226_i.

(Step B7)

Turning back to FIG. 14, a step B7 in the operation of the random number generation server device 210_0 according to the second example embodiment is equivalent to the step B7 in the operation of the random number generation server device 100_0 according to the first example embodiment. However, bit-shares [r_t]_B, [r_t]_B1, and [r_t]_Bi of the random number are transmitted to the random number generation server device 210_0, the masked value restoration server device 220_1, and the i-th secure computation server device 220_i, respectively, and are saved in their respective data storage units 216_0, 226_1, and 226_i.

(Step A8)

Referring to FIGS. 14 to 16, a step A8 in the operation of the random number generation server device 210_0, the masked value restoration server device 220_1, and the i-th secure computation server device 220_i according to the second example embodiment is equivalent to the step A8 in the operation of the random number generation server device 100_0, the masked value restoration server device 110_1, and the i-th secure computation server device 110_i according to the first example embodiment. However, the determined results [res]_B0, [res]_B, and [res]_Bi are stored in the data storage units 216_0, 226_1, and 226_i, respectively.

(Step X9)

Turning back to FIG. 13, in a case of obtaining a result of equality determination, the secret shared data restoration unit 202 included in the secret shared proxy device 200 fetches the determined results [res]_B0, [res]_B1, and [res]_Bi from the data storage units 216_0, 226_1, and 226_i, respectively, to restore the result of equality determination.

The second example embodiment of the present invention described above has not only the first effect which is described in the first example embodiment but also a second effect which will be described in the following.

The second effect is that the random number generation server device and the i-th secure computation server device are configured with less constituent modules. Specifically, as compared with the random number generation server device 100_0 according to the first example embodiment, the random number generation server device 210_0 is configured with constituent modules which are less in number by a part corresponding to the secret shared data restoration unit 104_0. In addition, as compared with the i-th secure computation server device 110_i according to the first example embodiment, the i-th secure computation server device 220_i is configured with constituent modules which are less in number by a part corresponding to the secret shared data generation unit 113_i and the secret shared data restoration unit 114_i. However, it is noted that the secret shared proxy device 200 is required.

It is noted that the determination method carried out by the above-mentioned secret equality determination system or the respective server devices may be implemented by hardware, software, or a combination thereof. Herein, being implemented by the software means being implemented by reading and executing, by a computer, a secret equality determination program.

The secret equality determination program may be stored in various types of non-transitory computer readable media and may be supplied to the computer. The non-transitory computer readable media include various types of tangible storage media. Examples of the non-transitory computer readable media include a magnetic recording medium (e.g. a flexible disk, a magnetic tape, and a hard disk drive), a magneto-optical recording medium (e.g. a magneto-optical disc), a CD-ROM (Read Only Memory), a CD-R, a CD-R/W, and a semiconductor memory (e.g. a mask ROM, a PROM (Programmable ROM), an EPROM (Erasable PROM), a flash ROM, and a RAM (random access memory)). In addition, the secret equality determination program may be supplied to the computer by various types of transitory computer readable media. Examples of the transitory computer readable media include an electric signal, an optical signal, and an electromagnetic wave. The transitory computer readable medium can supply the secret equality determination program to the computer via a wire communication channel such as an electric wire or an optical fiber or a wireless communication channel.

While the present invention has been described with reference to the example embodiments thereof, the invention is not limited to these example embodiments. It will be understood by those ordinary skilled in the art that various changes in configuration and details may be made therein without departing from the scope of the present invention.

A part or a whole of the above-mentioned example embodiments may be described as, but not limited to, the following supplementary notes.

(Supplementary Note 1)

A random number generation server device, comprising:

a random number generation unit configured to generate a random number;

a secret shared data generation unit configured to generate a ring-share related to a value of a difference between two operands, to generate bit-shares of the random number, and to transmit the bit-shares of the random number to other server devices;

a share addition unit configured to add the random number to the ring-share to generate masked secret shared data and to transmit the masked secret shared data to a masked value restoration server device;

a determination bit-conjunction unit configured to perform secret equality determination using the bit-shares of the random number and bit-shares of a restored value received from the masked value restoration server device and to transmit a determined result to the other server devices: and a secret shared data restoration unit configured to restore bit-shares of the determined result based on the determined result and determined results from the other server devices.

(Supplementary Note 2)

A masked value restoration server device, comprising:

a secret shared data generation unit configured to generate a ring-share related to a value of a difference between two operands and to generate bit-shares of a restored value;

a secret shared data restoration unit configured to restore a masked value using the ring-share, a plurality of ring-shares which are fetched from a plurality of secure computation server devices, and masked secret shared data received from a random number generation server device and to produce the restored value; and a determination bit-conjunction unit configured to perform secret equality determination using the bit-shares of the random number received from the random number generation server device and the bit-shares of the restored value and to transmit a determined result to other server devices, wherein the secret shared data restoration unit is configured to restore bit-shares of the determined result based on the determined result and determined results from the other server devices.

(Supplementary Note 3)

A secure computation server device, comprising:

a secret shared data generation unit configured to generate a ring-share related to a value of a difference between two operands;

a determination bit-conjunction unit configured to perform secret equality determination using bit-shares of a random number received from a random number generation server device and bit-shares of a restored value received from a masked value restoration server device, and to transmit a determined result to other server devices; and a secret shared data restoration unit configured to restore bit-shares of the determined result based on the determined result and determined results from the other server devices.

(Supplementary Note 4)

A secret equality determination system comprising a random number generation server device described in Supplementary Note 1; a masked value restoration server device described in Supplementary Note 2; and a plurality of secure computation server devices each of which is described in Supplementary Note 3, the random number generation server device, the masked value restoration server device, and the plurality of secure computation server devices being connected to one another via a network.

(Supplementary Note 5)

A secret equality determination method in a random number generation server device, comprising the steps of:

generating a ring-share related to a value of a difference between two operands;

generating a random number;

adding the random number to the ring-share to generate masked secret shared data and transmitting the masked secret shared data to a masked value restoration server device;

generating bit-shares of the random number;

performing secret equality determination using the bit-shares of the random number and bit-shares of a restored value received from the masked value restoration server device and transmitting a determined result to other server devices; and restoring bit-shares of the determined result based on the determined result and determined results from the other server devices.

(Supplementary Note 6)

A secret equality determination method in a masked value restoration server device, comprising the steps of:

generating a ring-share related to a value of a difference between two operands;

restoring a masked value using the ring-share, a plurality of ring-shares which are fetched from a plurality of secure computation server devices, and masked secret shared data received from a random number generation server device to produce a restored value;

generating bit-shares of the restored value;

performing secret equality determination using the bit-shares of the random number received from the random number generation server device and the bit-shares of the restored value and transmitting a determined result to other server devices; and restoring bit-shares of the determined result based on the determined result and determined results from the other server devices.

(Supplementary Note 7)

A secret equality determination method in a secure computation server device, comprising the steps of:

generating a ring-share related to a value of a difference between two operands;

performing secret equality determination using bit-shares of a random number received from a random number generation server device and bit-shares of a restored value received from a masked value restoration server device and transmitting a determined result to other server devices; and restoring bit-shares of the determined result based on the determined result and determined results from the other server devices.

(Supplementary Note 8)

A recording medium storing a secret equality determination program which causes a computer of a random number generation server device to execute:

a process of generating a ring-share related to a value of a difference between two operands;

a process of generating a random number;

a process of adding the random number to the ring-share to generate masked secret shared data and of transmitting the masked secret shared data to a masked value restoration server device;

a process of generating bit-shares of the random number:

a process of performing secret equality determination using the bit-shares of the random number and bit-shares of a restored value received from the masked value restoration server device and of transmitting a determined result to other server devices; and a process of restoring bit-shares of the determined result based on the determined result and determined results from the other server devices.

(Supplementary Note 9)

A recording medium storing a secret equality determination program which causes a computer of a masked value restoration server device to execute:

a process of generating a ring-share related to a value of a difference between two operands;

a process of restoring a masked value using the ring-share, a plurality of ring-shares which are fetched from a plurality of secure computation server devices, and masked secret shared data received from a random number generation server device to produce a restored value;

a process of generating bit-shares of the restored value;

a process of performing secret equality determination using the bit-shares of the random number received from the random number generation server device and the bit-shares of the restored value and of transmitting a determined result to other server devices; and a process of restoring bit-shares of the determined result based on the determined result and determined results from the other server devices.

(Supplementary Note 10)

A recording medium storing a secret equality determination program which causes a computer of a secure computation server device to execute:

a process of generating a ring-share related to a value of a difference between two operands;

a process of performing secret equality determination using bit-shares of a random number received from a random number generation server device and bit-shares of a restored value received from a masked value restoration server device and of transmitting a determined result to other server devices; and a process of restoring bit-shares of the determined result based on the determined result and determined results from the other server devices.

(Supplementary Note 11)

A secret shared proxy device, comprising:

a secret shared data generation unit configured to secretly sharing two operands to generate ring-shares related to the two operands and to transmit the generated ring-shares related to the two operands to a plurality of server devices; and a secret shared data restoration unit configured to restore an equality determined result based on determined results received from the plurality of server devices.

(Supplementary Note 12)

A random number generation server device, comprising:

a random number generation unit configured to generate a random number;

a secret shared data generation unit configured to generate, based on ring-shares related to two operands received from a secret shared proxy device, a ring-share related to a value of a difference between the two operands, to generate bit-shares of the random number, and to transmit the bit-shares of the random number to other server devices;

a share addition unit configured to add the random number to the ring-share related to a value of a difference between the two operands to generate masked secret shared data and to transmit the masked secret shared data to a masked value restoration server device; and a determination bit-conjunction unit configured to perform secret equality determination using the bit-shares of the random number and bit-shares of a restored value received from the masked value restoration server device and to transmit a determined result to the secret shared proxy device.

(Supplementary Note 13)

A masked value restoration server device, comprising:

a secret shared data generation unit configured to generate, based on ring-shares related to two operands received from a secret shared proxy device, a ring-share related to a value of a difference between the two operands and to generate bit-shares of a restored value;

a secret shared data restoration unit configured to restore a masked value using the ring-share, a plurality of ring-shares which are fetched from a plurality of secure computation server devices, and masked secret shared data received from a random number generation server device and to produce the restored value: and a determination bit-conjunction unit configured to perform secret equality determination using the bit-shares of the random number received from the random number generation server device and the bit-shares of the restored value and to transmit a determined result to the secret shared proxy device.

(Supplementary Note 14)

A secure computation server device, comprising:

a determination bit-conjunction unit configured to perform secret equality determination using bit-shares of a random number received from a random number generation server device and bit-shares of a restored value received from a masked value restoration server device, and to transmit a determined result to the secret shared proxy device.

(Supplementary Note 15)

A secret equality determination system comprising a secret shared proxy device described in Supplementary Note 11; a random number generation server device described in Supplementary Note 12: a masked value restoration server device described in Supplementary Note 13; and a plurality of secure computation server devices each of which is described in Supplementary Note 14, the secret shared proxy device, the random number generation server device, the masked value restoration server device, and the plurality of secure computation server devices being connected to one another via a network.

(Supplementary Note 16)

A secret equality determination method in a random number generation server device, comprising the steps of:

generating, based on ring-shares related to two operands received from a secret shared proxy device, a ring-share related to a value of a difference between the two operands, generating a random number;

generating bit-shares of the random number to transmit the bit-shares of the random number to other server devices;

adding the random number to the ring-share related to a value of a difference between the two operands to generate masked secret shared data and to transmit the masked secret shared data to a masked value restoration server device; and performing secret equality determination using the bit-shares of the random number and bit-shares of a restored value received from the masked value restoration server device and transmitting a determined result to the secret shared proxy device.

(Supplementary Note 17)

A secret equality determination method in a masked value restoration server device, comprising the steps of:

generating, based on ring-shares related to two operands received from a secret shared proxy device, a ring-share related to a value of a difference between the two operands restoring a masked value using the ring-share, a plurality of ring-shares which are fetched from a plurality of secure computation server devices, and masked secret shared data received from a random number generation server device to produce a restored value;

generating bit-shares of the restored value; and performing secret equality determination using the bit-shares of the random number received from the random number generation server device and the bit-shares of the restored value and transmitting a determined result to the secret shared proxy device.

(Supplementary Note 18)

A secret equality determination method in a secure computation server device, comprising the step of:

performing secret equality determination using bit-shares of a random number received from a random number generation server device and bit-shares of a restored value received from a masked value restoration server device and transmitting a determined result to the secret shared proxy device.

(Supplementary Note 19)

A recording medium storing a secret equality determination program which causes a computer of a random number generation server device to execute:

a process of generating, based on ring-shares related to two operands received from a secret shared proxy device, a ring-share related to a value of a difference between the two operands, a process of generating a random number;

a process of generating bit-shares of the random number to transmit the bit-shares of the random number to other server devices;

a process of adding the random number to the ring-share related to a value of a difference between the two operands to generate masked secret shared data and of transmitting the masked secret shared data to a masked value restoration server device; and a process of performing secret equality determination using the bit-shares of the random number and bit-shares of a restored value received from the masked value restoration server device and of transmitting a determined result to the secret shared proxy device.

(Supplementary Note 20)

A recording medium storing a secret equality determination program which causes a computer of a masked value restoration server device to execute:

a process of generating, based on ring-shares related to two operands received from a secret shared proxy device, a ring-share related to a value of a difference between the two operands;

a process of restoring a masked value using the ring-share, a plurality of ring-shares which are fetched from a plurality of secure computation server devices, and masked secret shared data received from a random number generation server device to produce a restored value;

a process of generating bit-shares of the restored value: and a process of performing secret equality determination using the bit-shares of the random number received from the random number generation server device and the bit-shares of the restored value and of transmitting a determined result to the secret shared proxy devices.

(Supplementary Note 21)

A recording medium storing a secret equality determination program which causes a computer of a secure computation server device to execute:

a process of performing secret equality determination using bit-shares of a random number received from a random number generation server device and bit-shares of a restored value received from a masked value restoration server device and of transmitting a determined result to the secret shared proxy device.

INDUSTRIAL APPLICABILITY

According to this invention, it is possible to execute, for example, secret equality determination, which takes place in character string processing in a database, with the number of communication rounds reduced to O (Log (L)), regardless of the secret sharing scheme. It is therefore possible to reduce the communication traffic by improvement of constituent components with respect to the secret equality determination and an upper protocol using the secret equality determination.

REFERENCE SIGNS LIST

100_0 random number generation server device
101_0 random number generation unit
102_0 share addition unit
103_0 secret shared data generation unit
104_0 secret shared data restoration unit
105_0 determination bit-conjunction unit
106_0 data storage unit
110_1 masked data restoration server device
113_1 secret shared data generation unit
114_1 secret shared data restoration unit
115_1 determination bit-conjunction unit
116_1 data storage unit
110_i secure computation server device
113_i secret shared data generation unit
114_i secret shared data restoration unit
115_i determination bit-conjunction unit
116_i data storage unit
200 secret shared proxy device
201 secret shared data generation unit
202 secret shared data restoration unit
210_0 random number generation unit
220_1 masked data restoration server device
226_1 data storage unit
220_i secure computation server device
226_i data storage unit

The invention claimed is:

1. A random number generation server device, comprising:
a random number generation unit configured to generate a random number;
a secret shared data generation unit configured to generate a ring-share related to a value of a difference between two operands, to generate bit-shares of the random number, and to transmit the bit-shares of the random number to other server devices;
a share addition unit configured to add the random number to the ring-share to generate masked secret shared data and to transmit the masked secret shared data to a masked value restoration server device;
a determination bit-conjunction unit configured to perform secret equality determination using the bit-shares of the random number and bit-shares of a restored value received from the masked value restoration server device and to transmit a determined result to the other server devices; and
a secret shared data restoration unit configured to restore bit-shares of the determined result based on the determined result and determined results from the other server devices.

2. A masked value restoration server device, comprising:
a secret shared data generation unit configured to generate a ring-share related to a value of a difference between two operands and to generate bit-shares of a restored value;
a secret shared data restoration unit configured to restore a masked value using the ring-share, a plurality of ring-shares which are fetched from a plurality of secure computation server devices, and a masked secret shared data received from a random number generation server device and to produce the restored value; and
a determination bit-conjunction unit configured to perform secret equality determination using the bit-shares of the random number received from the random number generation server device and the bit-shares of the restored value and to transmit a determined result to other server devices,
wherein the secret shared data restoration unit is configured to restore bit-shares of the determined result based on the determined result and determined results from the other server devices.

3. A secure computation server device, comprising:
a secret shared data generation unit configured to generate a ring-share related to a value of a difference between two operands;
a determination bit-conjunction unit configured to perform secret equality determination using bit-shares of a random number received from a random number generation server device and bit-shares of a restored value received from a masked value restoration server device, and to transmit a determined result to other server devices; and
a secret shared data restoration unit configured to restore bit-shares of the determined result based on the determined result and determined results from the other server devices.

4. A secret equality determination system comprising a random number generation server device; a masked value restoration server device; and a plurality of secure computation server devices, the random number generation server device, the masked value restoration server device, and the plurality of secure computation server devices being connected to one another via a network,
wherein the random number generation device comprises:
a random number generation unit configured to generate a random number;
a first secret shared data generation unit configured to generate a first ring-share related to a value of a difference between two operands, to generate bit-shares of the random number, and to transmit the bit-shares of the random number to other server devices;
a share addition unit configured to add the random number to the first ring-share to generate masked secret shared data and to transmit the masked secret shared data to the masked value restoration server device;
a first determination bit-conjunction unit configured to perform first secret equality determination using the bit-shares of the random number and bit-shares of a restored value received from the masked value restoration server device and to transmit a first determined result to the other sever devices; and a first secret shared data restoration unit configured to restore bit-shares of the first determined result based on the first determined result and determined results from the other server devices, wherein the masked value restoration server device comprises:

a second secret shared data generation unit configured to generate a second ring-share related to a value of a difference between the two operands and to generate the bit-shares of the restored value;

a second secret shared data restoration unit configured to restore a masked value using the second ring-share, a plurality of ring-shares which are fetched from the plurality of secure computation server devices, and the masked secret shared data received from the random number generation server device and to produce the restored value; and a second determination bit-conjunction unit configured to perform second secret equality determination using the bit-shares of the random number received from the random number generation server device and the bit-shares of the restored value and to transmit a second determined result to other sever devices, wherein the second secret shared data restoration unit is configured to restore bit-shares of the second determined result based on the second determined result and determined results from the other server devices, and wherein each of the plurality of secure computation server devices comprises:

a third secret shared data generation unit configured to generate a third ring-share related to a value of a difference between the two operands;

a third determination bit-conjunction unit configured to perform third secret equality determination using the bit-shares of the random number received from the random number generation server device and the bit-shares of the restored value received from the masked value restoration server device, and to transmit a third determined result to other sever devices; and a third secret shared data restoration unit configured to restore bit-shares of the third determined result based on the third determined result and determined results from the other server devices.

5. A secret shared proxy device, comprising:

a secret shared data generation unit configured to secretly sharing two operands to generate ring-shares related to the two operands and to transmit the generated ring-shares related to the two operands to a plurality of server devices, the ring-shares related to a value of a difference between the two operands; and a secret shared data restoration unit configured to restore an equality determined result based on determined results received from the plurality of server devices.

6. A random number generation server device, comprising:

a random number generation unit configured to generate a random number;

a secret shared data generation unit configured to generate, based on ring-shares related to two operands received from a secret shared proxy device, a ring-share related to a value of a difference between the two operands, to generate bit-shares of the random number, and to transmit the bit-shares of the random number to other server devices;

a share addition unit configured to add the random number to the ring-share related to a value of a difference between the two operands to generate masked secret shared data and to transmit the masked secret shared data to a masked value restoration server device; and a determination bit-conjunction unit configured to perform secret equality determination using the bit-shares of the random number and bit-shares of a restored value received from the masked value restoration server device and to transmit a determined result to the secret shared proxy device.

7. A masked value restoration server device, comprising:

a secret shared data generation unit configured to generate, based on ring-shares related to two operands received from a secret shared proxy device, a ring-share related to a value of a difference between the two operands and to generate bit-shares of a restored value;

a secret shared data restoration unit configured to restore a masked value using the ring-share, a plurality of ring-shares which are fetched from a plurality of secure computation server devices, and masked secret shared data received from a random number generation server device and to produce the restored value; and a determination bit-conjunction unit configured to perform secret equality determination using the bit-shares of the random number received from the random number generation server device and the bit-shares of the restored value and to transmit a determined result to the secret shared proxy device.

8. A secret equality determination system comprising a secret shared proxy device; a random number generation server device; a masked value restoration server device; and a plurality of secure computation server devices, the secret shared proxy device, the random number generation server device, the masked value restoration server device, and the plurality of secure computation server devices being connected to one another via a network, wherein the secret shared proxy device comprises:

a first secret shared data generation unit configured to secretly sharing two operands to generate ring-shares related to the two operands and to transmit generated ring-shares related to the two operands to a plurality of server devices; and a first secret shared data restoration unit configured to restore an equality determined result based on determined results received from the plurality of server devices, wherein the random number generation server device comprises:

a random number generation unit configured to generate a random number;

a second secret shared data generation unit configured to generate, based on the ring-shares related to the two operands received from the secret shared proxy device, a first ring-share related to a value of a difference between the two operands, to generate bit-share of the random number, and to transmit the bit-shares of the random number to other server devices;

a share addition unit configured to add the random number to the first ring-share related to the value of the difference between the two operands to generate masked secret shared data and to transmit the masked secret shared data to the masked value restoration server device; and a first determination bit-conjunction unit configured to perform first secret equality determination using the bit-shares of the random number and bit-shares of a restored value received from the masked value restoration server device and to transmit a first determined result to the secret shared proxy device, wherein the masked value restoration server device comprises:

a third secret shared data generation unit configured to generate, based on the ring-shares related to the two operands received from the secret shared proxy device, a second ring-share related to the value of the difference between the two operands and to generate bit-shares of a restored value;

a second secret shared data restoration unit configured to restore a masked value using the second ring-share, a plurality of ring-shares which are fetched from the plurality of secure computation server devices, and the masked secret shared data received from the random number generation server device and to produce the restored value; and a second determination bit-conjunction unit configured to perform second secret equality determination using the bit-shares of the random number received from the random number generation server device and the bit-shares of the restored value and to transmit a second determined result to the secret shared proxy devices, and wherein each of the plurality of secure computation server devices comprises:

a third determination bit-conjunction unit configured to perform third secret equality determination using the bit-shares of the random number received from the random number generation server device and the bit-shares of the restored value received from the masked value restoration server device, and to transmit a third determined result to the secret shared proxy device.

* * * * *